United States Patent [19]
Commerford

[11] Patent Number: 5,920,257
[45] Date of Patent: Jul. 6, 1999

[54] SYSTEM AND METHOD FOR ISOLATING AN OUTAGE WITHIN A COMMUNICATIONS NETWORK

[75] Inventor: G. L. Commerford, Colorado Springs, Colo.

[73] Assignee: MCI Communications Corporation, Washington, D.C.

[21] Appl. No.: 08/903,666

[22] Filed: Jul. 31, 1997

[51] Int. Cl.[6] .............................. G08B 29/00; G06F 11/00
[52] U.S. Cl. .................... 340/506; 340/825.16; 370/244; 370/250; 370/242; 395/183.18; 395/182.05
[58] Field of Search ................................ 340/506, 825.06, 340/825.16; 370/242, 244, 250; 395/200.54, 200.59, 750.06, 182.18, 185.1, 183.19, 183.18, 182.05; 707/203; 364/186, 187, 188, 146

[56] References Cited

U.S. PATENT DOCUMENTS

| | | | |
|---|---|---|---|
| 5,598,566 | 1/1997 | Pascucci et al. | 395/750 |
| 5,704,036 | 12/1997 | Brownmiller et al. | 370/907 |
| 5,748,617 | 5/1998 | McLain, Jr. | 370/244 |
| 5,771,274 | 6/1998 | Harris | 340/825.16 |

*Primary Examiner*—Donnie L. Crosland

[57] ABSTRACT

A system and method for isolating an outage within a communications network comprising a database containing the configuration of switching elements within a network and a plurality of instructions resident on a memory device for operating a control computer wherein the plurality of instructions include a code segment for receiving alarms from the switching elements, a code segment for determining which of the alarms indicate an outage, and a code segment for identifying the location of the switching elements that isolate the outage based upon the configuration of the switching elements in the database are disclosed.

20 Claims, 16 Drawing Sheets

SYSTEM AND METHOD FOR ISOLATING AN OUTAGE WITHIN A COMMUNICATIONS NETWORK

TECHNICAL FIELD OF THE INVENTION

This invention relates, in general, to the restoration of network information systems, and in particular to, a system and method for isolating an outage between switching devices within a communications network using real-time network architecture data.

BACKGROUND OF THE INVENTION

Without limiting the scope of the present invention, the background is described in connection with telecommunication networks.

Telecommunication networks serve a vital role in both the public and private sectors. For example, businesses and individuals rely on these sophisticated networks to transport information, both voice and data, from one location to another. Of particular importance to both businesses and individuals is the reliability and cost of communicating via the telecommunications infrastructure. For example, if an outage occurs within a telecommunication network, vast amounts of information may be lost coupled with the substantial costs associated therewith.

Network outages develop when a discontinuity occurs within the network architecture. A discontinuity within the network may result for reasons such as, a natural disaster, accidental or intentional human intervention, or faulty network components. Regardless of the cause of the network outage, however, the communication within the network must be restored as promptly as possible to avoid unnecessary and costly disruptions in communication.

Presently, restoration of communications service is implemented by selecting alternate routes within the network which are not effected by the outage. Typically, a restoration pre-plan is used. These pre-plans are developed from network topology information which is periodically gathered and stored. It has been found, however, that due to the rapid and continuous nature of changes to the architecture of networks, the data used to prepare the pre-plans and therefore the pre-plans themselves may be obsolete before they are implemented. When a pre-plan is unsuccessful, an audit of the network architecture is required to develop a new restoration plan. This ad-hoc approach to restoration of communications, however, has been found to take an unacceptably long period of time.

Therefore, a need has arisen for a reliable, efficient and cost effective method for restoring communication after a network outage occurs. A need has also arisen for a method of maintaining real-time information regarding network architecture. Further, a need has arisen for a system and method for isolating an outage between switching devices within a communications network using real-time network architecture data.

SUMMARY OF THE INVENTION

The present invention disclosed herein comprises a system and method that reliably, efficiently and cost effectively restore communication within a network after a network outage has occurred. The system and method of the present invention also isolates an outage between switching devices within a communications network using real-time network architecture data to establish the parameters of the outage and start the restoration process.

The system and method of the present invention comprises a database containing the configuration of switching elements within a network and a plurality of instructions resident on a memory device for operating a control computer. The plurality of instructions includes a code segment for receiving alarms from the switching elements. The alarms include information regarding the specific ports on specific switching elements that are in alarm. Once alarms are received, a code segment determines whether the alarms indicate an outage including whether the alarms were generated on a spare trunk or generated on a traffic trunk. If the alarm is on a traffic truck, a code segment determines the priority of the traffic trunk. Additionally, the determination of whether an outages has occurred may include requiring a plurality of alarms on the same trunk or alarms on a plurality of trunks before an outage is declared.

Once an outage has been declared, the system and method of the present invention includes a code segment for identifying the location of the switching elements that isolate the outage based upon the configuration of the switching elements in the database. This code segment identifies the location of the ports in alarm on each switching element relative to the location of the ports in alarm on other switching elements to isolate the outage so that a restoration route may be generated to restore communication within the network.

The system and method of the present invention also generates and maintains a list of trunks effected by the outage. The list is used to make sure that all trucks effected by the outage are restored, to prevent redundant restoration routes from being generated and to provide a source of information during the normalization process once the cause of the outage is determined and corrected.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
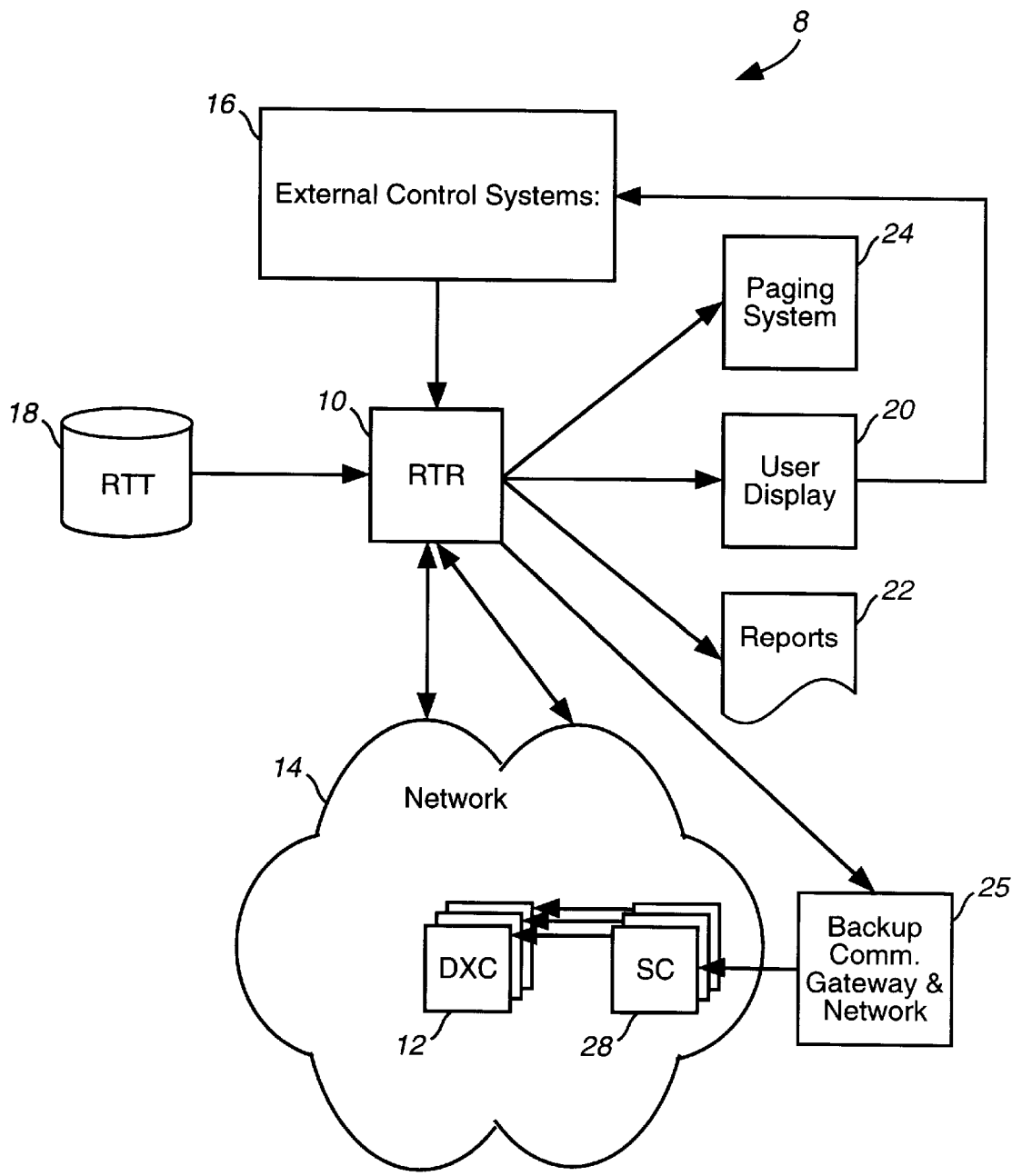
FIG. 1 is an architectural diagram depicting a network restoration system of the present invention.

Referring now to FIG. 1, a high level network restoration architectural diagram illustrating the use of the present invention is shown and denoted generally as 8. Real time restoration (RTR) 10 is a software application that may be implemented on a high-performance midrange computer, such as, but not limited to, a DEC Alpha running with a Open VMS or VMS operating system. Alternatively, RTR 10 may be implemented on other types of computers or on multiple computers in a distributed architecture. It is also desirable to have two or more redundant, remotely located RTR 10 systems, one running as primary and the others as backup, for survivability purposes. RTR 10 is designed to accommodate this functionality with automated execution state designations, as will be described later.

The restoration network 8 may be implemented within a telecommunications network 14 with a plurality of network switching elements, such as a Digital Cross-Connect (DXC) 12. DXC 12 may be used to reroute information carrying lines in the event of an outage. Switching is performed based on commands generated and provided by RTR 10.

Network 14, which may be a protocol specific network, is used to transmit RTR 10 commands to each DXC 12. The network 14 is also used to transmit command responses and alarms, generated by the DXC 12, to RTR 10. Other means for communications through the network 14 between the RTR 10 and the DXC 12 may be used.

RTR 10 has an interface with one or more external control systems 16. These external control systems 16 represent any system or collection of systems that are used to create, store, and upload restoration pre-plans; provide a means for user input, such as selection of restoration mode (dynamic or pre-plan) and selection of pre-plans; and provide a means for user display of data. For example, user input to the RTR 10 may be achieved through a personal computer (PC) or workstation (WS). Other automated input, such as restoration pre-plans, may be through another computer, such as an IBM mainframe.

It is possible to realize external control systems 16 on the same computer as RTR 10. The RTR 10 may interface with external control systems 16 on the same computer as RTR 10 via messaging to and from internal VMS mailboxes. Alternatively, the RTR 10 may interface with external control systems 16 on other computers, by way of DECNet messaging, when RTR 10 is implemented on a DEC Alpha computer.

RTR 10 also receives input from a real-time topology (RTT) database 18. RTT 18 contains data on the topology of network 14 including all components and trunks of network 14. This data is updated in real-time, so as to reflect the most current state of the network 14. RTR 10 is only interested in topology data as it pertains to a physical restoration network 14. Therefore, some processing is required within RTR 10 to extract and properly represent the data that is relevant to restoration. This will generally include data on DXC 12 devices and their inter connectivity.

Since RTT 18 contains data on all network 14 topology, it is typically stored and maintained external to RTR 10, as it has many purposes and uses independent of RTR 10. RTR 10 is designed to use data from RTT 18, for convenience of use, and to keep an internal store of select data relevant to restoration. This internal store of restoration data will be described later, in reference to FIG. 3 and FIG. 5.

RTR 10 is designed with a means for presenting results of restoration, and other data, to the user via a user display 20. This user display 20, which may be a graphical user interface (GUI), can be on the same computer as the external control system 16 for user input, which is generally a PC. This is conducive for purposes such as providing the user with a list of restoration options, then accepting the user's selection of an option.

Thus, while FIG. 1 shows the logical breakdown of components based on functionality, many functions, such as user display 20 and user input 16, may be realized on the same computer. Typically, other external control systems 16, such as development and maintenance of pre-plans, are realized on a different computer for performance reasons. However, it is possible to realize all external control systems 16 on a single computer.

RTR 10 is also designed with a means for producing reports 22. These reports 22 detail the results of restoration, error messages, other system messages, and other data desired by the user. Reports 22 may be customized to the user's needs. RTR 10 provides the means and data for generating such reports 22.

RTR 10 is also designed with a means for issuing a page to a developer if certain error messages are produced within RTR 10. An interface to a paging system 24 provides the means for delivering the page.

RTR 10 may also include a backup communications system with the DXCs 12. While network 14 provides primary communications through a pair of redundant binary data links to each DXC 12, a backup communications gateway and network 26 may be used to communicate with each DXC 12 in the event that primary communications fail. The backup communications gateway and network 26 provides data links to each DXC 12 by way of a site controller (SC) 28, one of which is located at each DXC 12 site. When RTR 10 detects failure in the primary communications, RTR 10 automatically shifts to the backup communications to reach the DXCs 12.

Using the architecture shown in FIG. 1, RTR 10 can support both a pre-plan and a dynamic restoration methodology on a common system platform. For a pre-plan methodology, pre-plans are developed on an external control system 16, such as an IBM mainframe. Pre-plans are then downloaded to another external control system 16, such as a PC.

When RTR 10 detects a network outage, it notifies the user through the user display 20 which may be a PC. The user may then select to utilize a pre-plan, or utilize dynamic restoration. If the user selects a pre-plan, the PC uploads that pre-plan to RTR 10, which proceeds to implement it. To implement a pre-plan, RTR 10 reads the actions from the pre-plan, which are stored in a generic format in a file, translates these actions to actual DXC 12 commands, and issues these commands to the DXC 12. Results of the pre-plan implementation are then provided to the user display 20. If the user selects dynamic restoration, RTR 10 proceeds to generate a restoral route dynamically. RTR 10 then implements that restoral route by issuing commands to the DXC 12 devices, and notifies the user of results.

Figure 2:
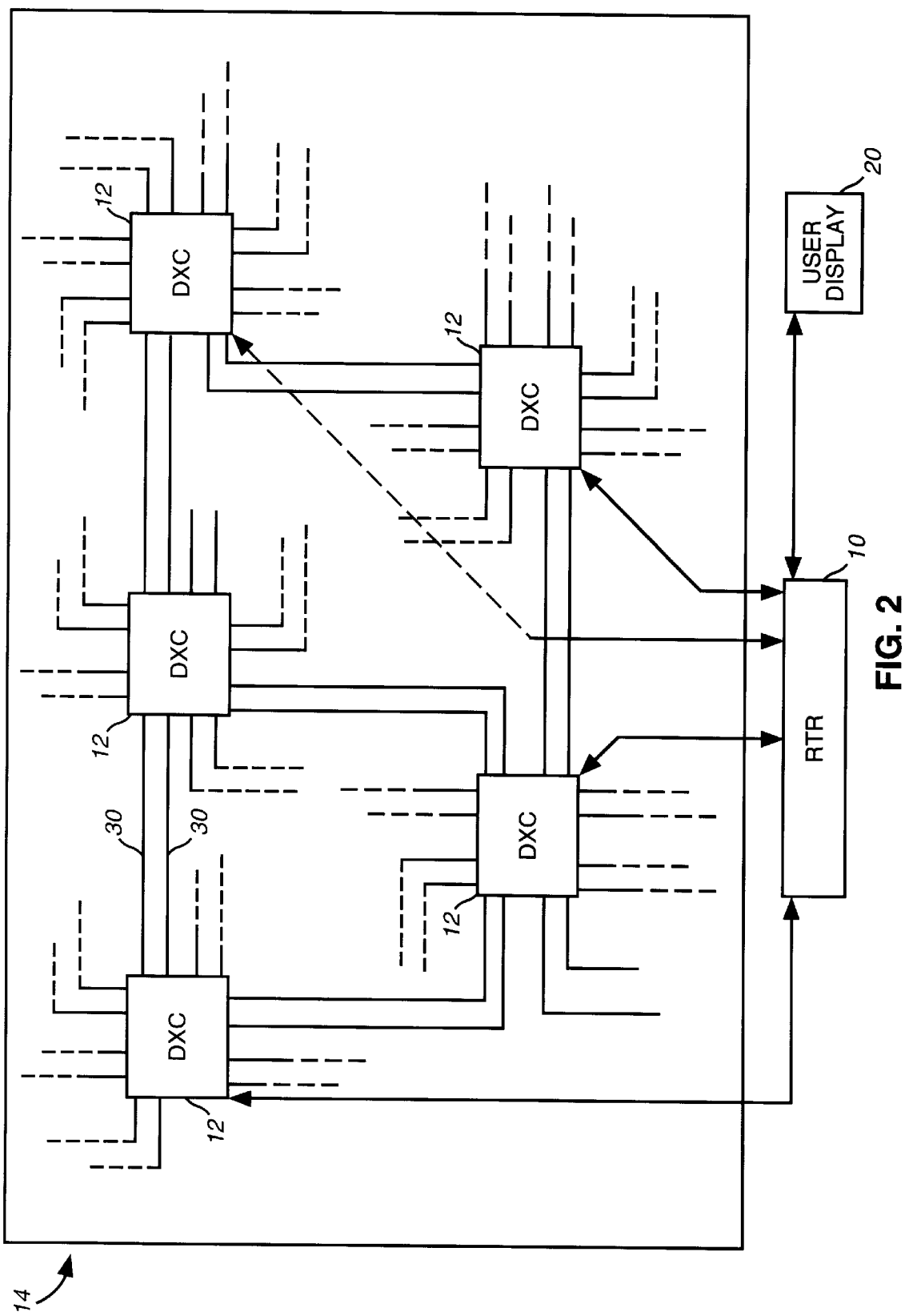
FIG. 2 is a schematic illustration of a typical network architecture.

Referring now to FIG. 2, a high level depiction of a network architecture consisting of network elements 12 is depicted and denoted generally as 14. Network 14 consists of a plurality of network elements, such as DXCs 12. The DXCs 12 within FIG. 2 can be bi-directional switching elements that are used to route information to a predetermined destination. For example, digital data, such as information distributed to and from LAN or WAN, digital voice data, such as telephone communication, and digital images, such as video conferencing. The DXCs 12 within a network 14 are memory resident within a logical topology, i.e., information concerning the configuration of each device is resident within memory of the RTR 18 database. The RTR 10 in FIG. 2, with the aid of the RTR 18 logical topology, is capable of determining the most efficient and cost effective route for restoration of service to the customer. The RTR 10 is only concerned with the RTR 18 topology that is available for restoration of traffic.

Information travels between two DXC 12 on trunk segments 30. Data flows in either direction down each trunk segment 30 with a predetermined destination. The DXCs 12 are capable of re-routing network data based on instructions from the RTR 10 and information associated with data that travel through the network 14. The destination routes for data are determined based on information regarding data type and destination.

Network communication problems usually occur when a disruption occurs within trunk segment 30. For example, segment 30 of network 14 could be disrupted due to a natural disaster, such as lightning striking a control center or from accidents cause by operating heavy equipment around trunk segment 30 which tears through trunk segment 30. Once service has been disrupted, DXCs 12 associated with the trunk segments 30 that are effected will be isolated and a restoration route is initiated by a pre-plan restoration route or by dynamically generating a restorable route with the RTR 10 in the most efficient and cost effective manner.

An alarm is generated by DXCs 12 when, among other things, a discontinuity or outage occurs within a trunk segment 30. The RTR 10 determines the validity of the alarm and the DXCs 12 generating the alarm to isolate the effected segments 30 and identify alternate routes to restore service. Factors effecting restoration lie within the boundaries of availability and costs.

Figure 3:
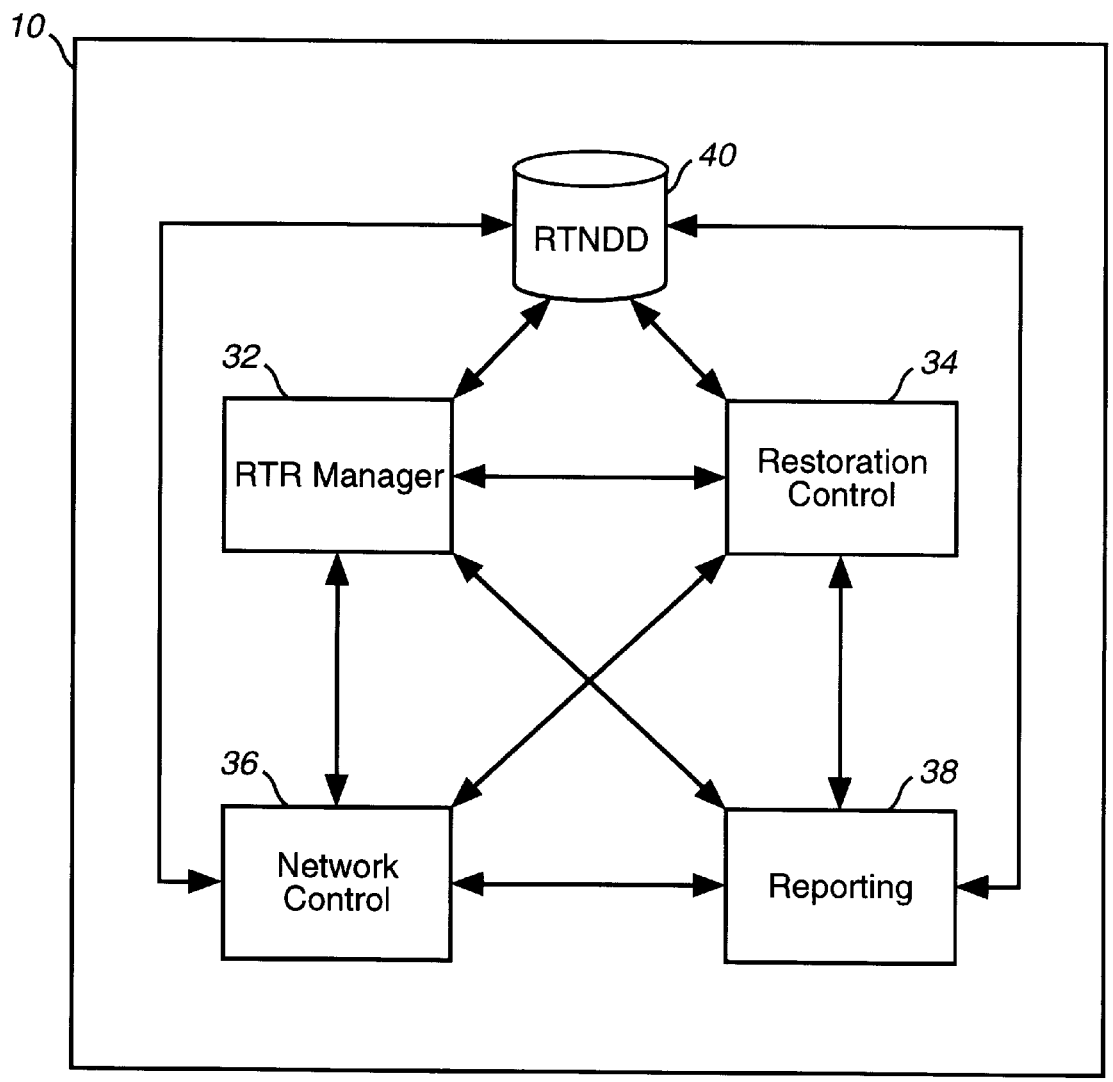
FIG. 3 is a block diagram illustrating an internal architecture of a network restoration system of the present invention.

FIG. 3 is a block diagram illustrating the high-level internal architecture of RTR 10. RTR 10 is comprised of four main process components which are an RTR manager 32, a restoration control 34, a network control 36, and a reporting component 38. Each of these components represent a collection of software processes. In addition, certain data elements are used by these components. Each component, consisting of several distinct processes and data elements, are shown in detail and described in reference to FIGS. 3–6.

Process components in RTR 10 can communicate with each other through messages that are passed among internal VMS mailboxes. Each process, several of which make up each high-level component shown in FIG. 3, has its own identifiable mailbox address. Using these mailbox addresses, each process can communicate with any other process by sending a properly addressed message. To aid in the convenience of inter-process communications, each high-level component shown in FIG. 3 has a process coordinator component that is responsible for, among other things, distributing messages to other processes within the same high-level component.

In addition to individual data elements used by each process component, the RTNDD 40, a centralized database containing restoration network device data is used. The RTNDD 40 contains data that reflects each restoration device, such as each DXC 12. It is organized such that each DXC 12 has its own partition within RTNDD 40, and within each DXC 12 partition are individual data elements for each DXC 12 port.

The RTNDD 40 is updated in real-time by the RTR manager 32 with the most current data reflecting the DXC 12 network. It is used by many different process components within RTR 10, as will be described in reference to FIGS. 5–8.

The RTR manager 32 provides a single interface to external control systems 16. This includes all external control systems 16, the RTT 18, and the user display 20. The only exception are the DXCs 12 via the network 14 and the backup communications network 26 which interface directly with network control 36.

RTR Manager 32 also provides centralized control of the RTR 10 system. It receives commands from the external control systems 16, and distributes the commands to internal processes. It also ensure responses are returned when needed. RTR manager 32 is responsible for receiving data from RTT 18, and updating and maintaining data in the RTNDD 40. The RTR manager 32 is described and shown in detail in FIG. 5.

Restoration control 34 is responsible for performing the algorithms for actual network restoration, including route generation for dynamic restoration. Using topology data from the RTNDD 40, restoration control 34 analyzes alarms received from the DXCs 12 and isolates the location of an outage. Restoration control then generates restoration routes for each impacted trunk 30, and sends commands needed to implement restoration routes to network control 36. Restoration control 34 is described and shown in detail in FIG. 6.

Network control 36 provides the interface to the DXC 12 Network. Network control 36 receives commands for DXCs 12 in a generic format from restoration control 34. Network control 36 may also receive commands from external control systems 16 through the RTR manager 32. Network control 36 then translates commands in this generic format to device-specific formats, and issues these commands to the appropriate DXCs 12. Network control 36 also receives responses and unsolicited alarms from DXCs 12, and distributes these to appropriate processes within RTR 10. Network control 36 manages the communications with the DXCs 12 using binary data links over the network 14, as well as backup communications 26. Network control 36 is described and shown in detail in FIG. 7.

Reporting 38 is responsible for generating all reports 22, issuing pages to a paging system 24, and providing data to the user display 20. Reporting 38 is described and shown in detail in FIG. 6.

There may be more than one instance of RTR 10, each instance running on a separate computer at a different physical location. This is for survivability of the RTR 10 system. However, only one instance of RTR 10 can have control over the restoration process, including communications with DXCs 12, at any one time. Therefore, each instance of RTR 10 runs in one of two execution states: primary and backup. Only one instance of RTR 10 runs in primary state at any time; and it is this instance that has control over the restoration process and maintains communications with the DXCs 12. All other instances of RTR 10 run in backup state. If the primary RTR 10 fails, a backup RTR 10 automatically take over.

The RTR 10 that is running in primary execution state runs in one of two readiness modes at any time. The two readiness modes are "ready" and "alert". Ready mode is the nominal mode. In ready mode, RTR 10 performs normal processing, including DXC 12 audits and RTNDD 40 updates. When a network outage is declared by RTR 10, based on receiving alarms from the DXCs 12, that meet certain criteria, RTR 10 changes to alert mode. In alert mode, all unnecessary processing, such as audits, cease and RTR 10 prepares to perform processing required for restoration.

Additionally, the RTR 10 that is running in primary execution state can be run with dynamic route generation (DRG) 25 enabled or disabled. This can be selected by the user. When DRG 25 is enabled, restoration control 34 performs dynamic restoration by generating a restoration route in real-time. When DRG 25 is disabled, restoration control 34 performs a restoration pre-plan, which is input by the user. When an outage is detected by RTR 10 and its location has been isolated, RTR 10 presents to the user a list of impacted trunks. The user, through an external control system 16, either selects dynamic restoration (DRG 25 enabled), or selects to use pre-plans (DRG 25 disabled). As noted before, all user input is received by the RTR manager 32 and distributed to other processes, such as those in the restoration control 34.

Figure 4:
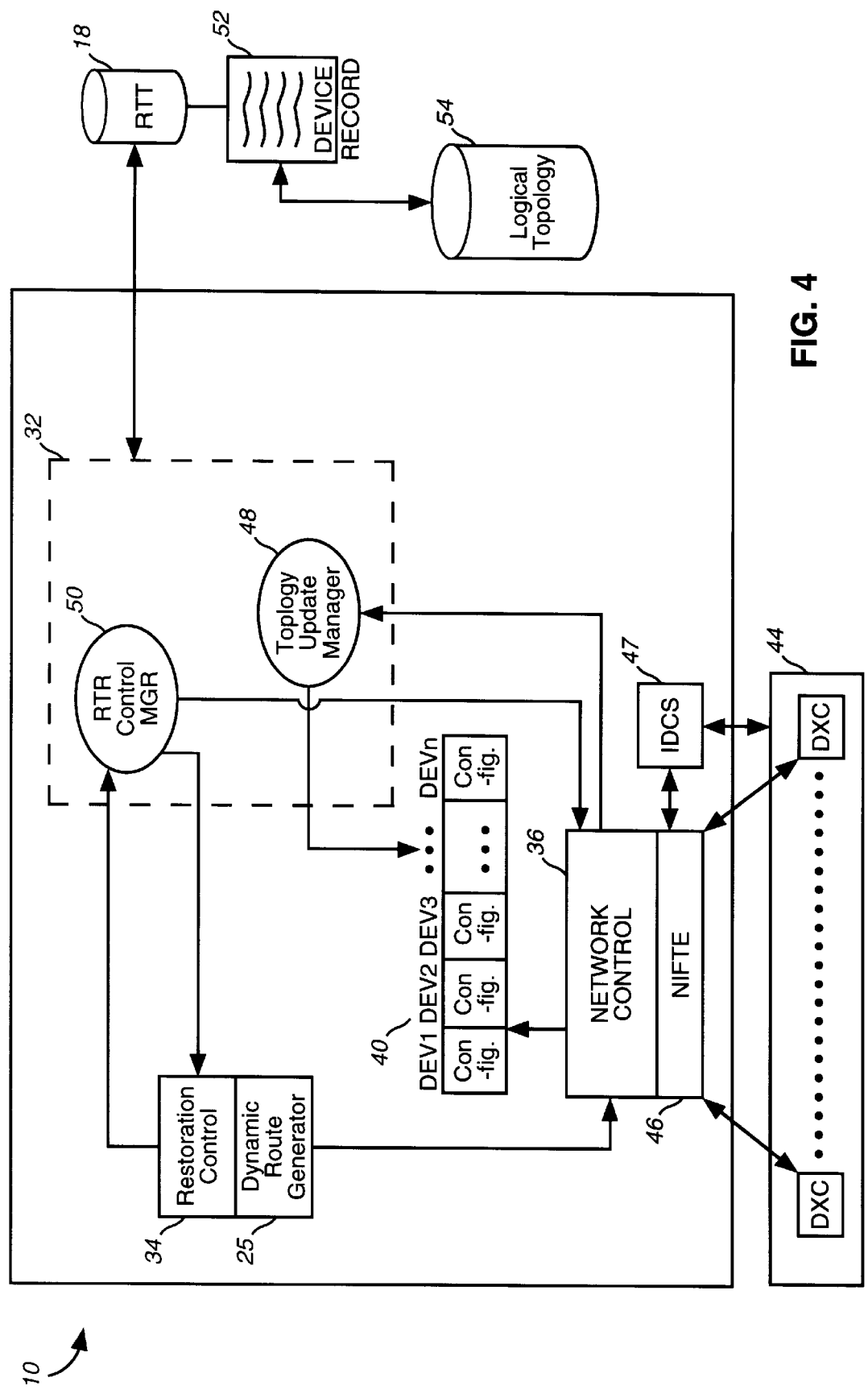
FIG. 4 is a block diagram of software components of a network restoration system of the present invention.

Now referring to FIG. 4 which is a block diagram of the software components that make up the structure of RTR 10, and in one embodiment the components that interface to the RTR 10. The components unique to the RTR 10 application, but not comprising the totality of the RTR 10 application, consists of: network control 44, network item front end (NIFTE) 46, RTNDD 40, topology update manager 48, RTR control manager 50, and restoration control 34.

The components that interface with the RTR 10 are the RTT 18, which maintains the logical topology 54 of the physical networks current status, and the network elements that make up the physical topology 44, such as the DXCs 12. The physical topology 44 is the actual network structure. The logical topology 54 is a virtual topology stored in the RTT 18 database consisting of binary records containing the current configuration of the physical database based upon user inputs. The physical topology 44 is based upon reporting of the network elements, such as DXCs 12, interfaced through network control 36.

Network control 36 is the process component within the RTR 10 application that communicates with the DXCs 12 through the NIFTEs 46. NIFTEs 46 maintain links between DXCs 12 and network control 36. The links allow network control 36 to distribute commands, such as connect and disconnect commands, to the DXCs 12. NIFTEs 46 receive communications from network control 36 in a nonspecific format and translates such information into a device specific format prior to sending commands to DXCs 12. Information is sent from DXCs 12 to NIFTEs 46 in a device specific format which NIFTEs 46 translates into a nonspecific format which is sent to network control 36. An alternate link to each DXCs 12 allows communication to proceed if the first link fails. Network control 36 provides required network device status to the RTNDD 40 database following audits of network 14.

The functionality of network control 36 encompasses link management, interface control, issuing connect and disconnect commands, alarm notification, and audit of a network architecture. Network control includes and manages an administration link, an audit link, a connect and disconnect link, and an alarm link. These are logically defined functions that perform evaluation tests and analysis on network elements, such as DXCs 12, via the links that are established between network control 36 and the network elements. Administration commands set the DXC 12 identification, downloads alarm specifications, and determines the types of DXC 12 within the network architecture. The audit link acquires information about each DXC 12, such as how many ports are on a particular DXC 12, the current configuration of the ports, what ports are cross connected to what ports, the availability of the ports, the status of the ports, and the alarm state of the ports. The audit provides the latest and most current configuration of the DXCs 12 which is needed by the higher level applications. The connect and disconnect channel is reserved primarily for issuing connect and disconnect commands during an outage. The alarm link issues alarm notification if a port goes into alarm. Unsolicited alarms are also sent through an alarm link. RTNDD 40 is the repository of all this information.

RTNDD 40 is an internal database memory resident to RTR 10. The RTNDD 40 is a series of memory partitions, each partition representing a DXC 12. For example, if there were 117 DXCs 12 there would be 117 entries containing information on the status of each DXC 12. The information contained within each device slot is broken down into specifics of the device. RTNDD 40 contains a header of information which identifies each DXC 12. The RTNDD 40 also contains DXC 12 configuration information including the number of port entries for each DXC 12, the type of port, such as data type, and whether the port is provisioned as spare capacity or traffic. RTNDD 40 identifies which port is currently cross connected to another port within the DXC 12.

Network control 36 provides for the verification of spare trunk connectivity. Network control 36 ensures operational readiness of all network links though a system of messages that check for network device functionality. Network control 36 can abstract the specifics of the network hardware by providing a device independent command set which will allow control of any type of DXC 12 device. Network control 36 provides a front end interface, the NIFTEs 46, to the RTR 10 controlled network devices.

The NIFTEs 46 translate the hardware independent commands into the appropriate device specific command. NIFTEs 46 provide asynchronous alarm notification to any requesting RTR 10 component. NIFTEs 46 configure and audit the DXCs 12 such that only one full audit is required at the initial connection to the DXC 12. Subsequently, the DXCs 12 will be configured such that any DXC 12 configuration changes will trigger alarms which the corresponding NIFTE 46 will accept and record the configuration change or initiate the appropriate audit. This approach is called audit by exception and is designed to significantly reduce the processing burden on the RTR 10. NIFTEs 46 will support multiple software and hardware versions of the DXCs 12. NIFTEs 46 may issue several device commands, update the RTNDD 40, receive unsolicited alarms, receive new NIFTE 46 commands, and finally receive a response to the commands issued.

The connection from network control 36 to each DXC 12 consists of two redundant diverse paths. There is a third link to the DXCs 12 within the network 14 in case the primary two links of communication fail. The IDCS 47 provides this service to network control 36. This link is much more limited but it is a alternate path which can be used to issue connect and disconnect commands from RTR 10 to DXCs 12.

The update manager 48 updates the RTNDD 40, with regard to the partitions within the device record that contain the information or status about each DXC 12. The RTNDD 40 contains the information of all the DXCx 12 within the network topology. The update manager 48 updates the RTNDD 40 in real time to reflect the current status of the network topology.

Restoration control 34 encapsulates the functions that load and analyze network responses, accepts user and network break specifications, presents pre-plan lists in response to break specifications, and accepts a pre-plan specification for execution. In addition, restoration control 34 isolates breaks from real-time alarms received from the DXCs 12, generates routes for the break spec specified, and submits the routes for execution. The primary data elements of restoration control 34 are DXC 12 alarms, breaks, break specifications, routes, plans, and actions.

A DXC 12 alarm may be, for example, a notification from the DXC 12 that the status of a port has changed. A break is a complete collection of break specifications and includes an indication of the end of a break. Each break has a unique ID. A break specification is a message that specifies that a trunk break has been detected and may include a break location if the trunk break was successfully isolated between two DXC 12 ports. A route is the collection of actions required to restore a break specification. A plan is a collection of actions designed to restore a break. An action is an instruction to perform an intra-DXC 12 connect or disconnect between two ports. Breaks are isolated to a port level. Inactivity over a period of time indicates the end of a break. After break isolation has completed, routes are generated based on trunk priority order and dispatched to network control 36 for transfer to the DXC 12.

Figure 5:
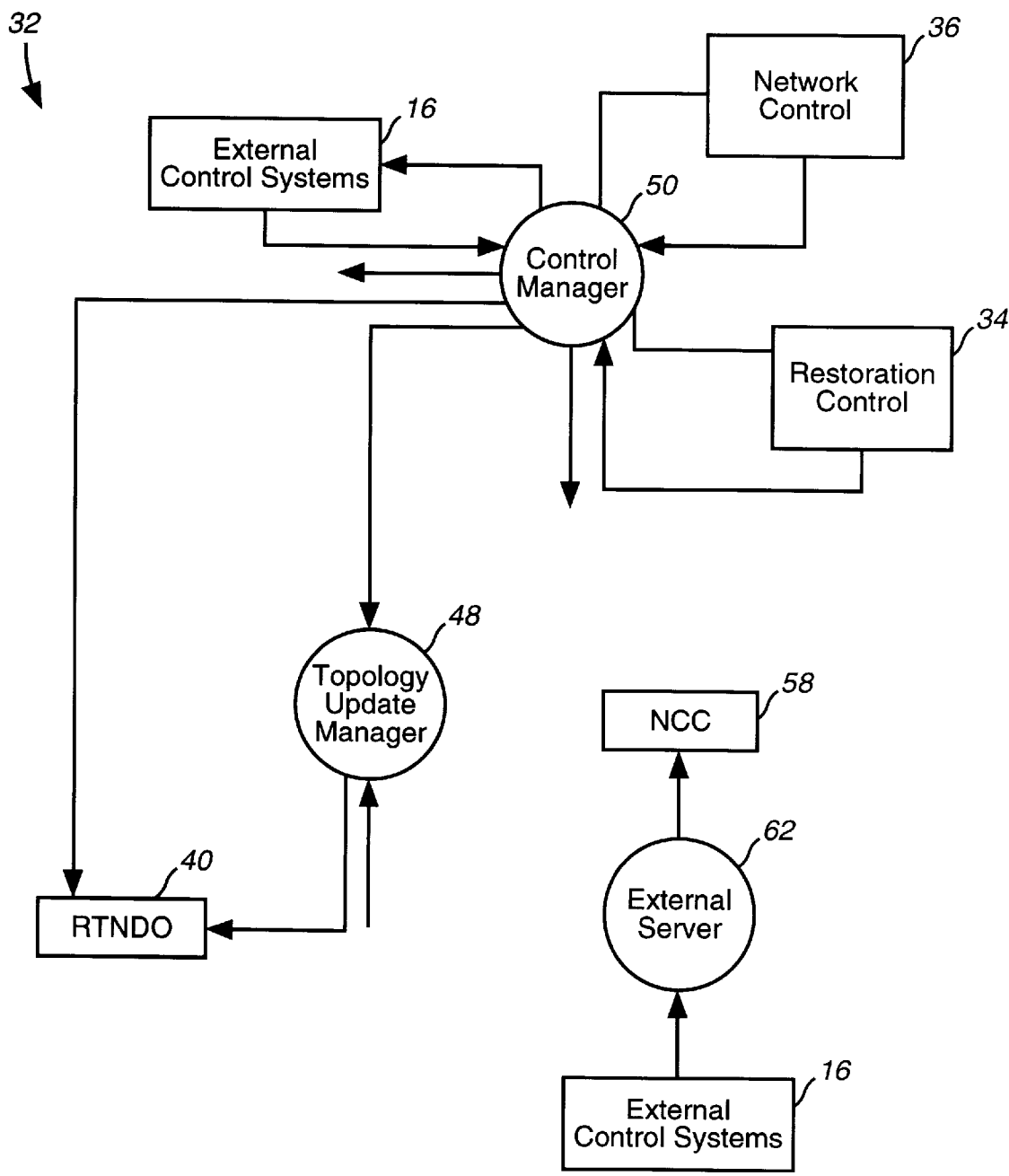
FIG. 5 is a block diagram of a control manager component of a network restoration system of the present invention.

FIG. 5 illustrates in detail the logical architecture of the RTR manager 32. Shown in FIG. 5 are the individual process components and the messages each process sends and receives. As noted before, each process can send messages to and receive messages from other processes.

There are two primary components unique to the RTR manager 32, a control manager 50 and a topology update manager 48. The control manager 50 serves as the interface to external systems. Control manager 50 receives commands from external control systems 16, distributes these commands to the appropriate internal processes, and ensures responses are returned when needed. For example, control manager 50 distributes commands to restoration control 34 and to network control 36. Control manager 50 can also distribute commands that are generated internally by RTR 10. Control manager 50 sends data to external systems as messages identified by internal commands.

Each command sent by control manager 50 to network control 36 has a corresponding response. For example, control manager 50 may send the following commands to network control 36. A command, which is provided by either a user or an external control system, that directs RTR 10 to change its execution state from primary to backup, or from backup to primary. This change in execution state is usually a result of a primary RTR 10 failing, and restoration control making a transition over to a backup RTR 10. Control manager 50 tracks the current execution state of each RTR 10 as an internal data parameter. In addition to updating the internal data parameter with the current execution state, control manager 50 notifies other processes of the change in execution state, which may result in starting up or shutting down of processes. This is done by sending messages to various internal control processes to either initiate processes for startup, or to terminate them for shut down.

Other commands are generated internally in RTR 10 and sent to control manager 50 when a network 14 outage is declared. A network 14 outage is declared when alarms received by DXCs 12 meet certain criteria, such as a specific number of alarms in a time interval. These criteria are used to eliminate spurious alarms that do not indicate an outage. When a network 14 outage is declared, control manager 50 sends out a command to change the readiness mode of RTR 10 from "ready" to "alert". In alert mode, all unnecessary processing, such as device audits and topology data updates, cease. When the outage is cleared, control manager 50 sends out a command to change the readiness mode of RTR 10 back to "ready". Control manager tracks the current readiness mode as an internal data parameter.

There are commands that instruct network control 36 to start and stop NIFTE 46 processes. A NIFTE 46 process is a component of network control 36 that serves as a communications interface with a DXC 12. There is a distinct instance of a NIFTE 46 process for each DXC 12. The start/stop NIFTE 46 commands can be generated internally upon startup of the RTR 10 system, or can be provided by an external system to request connection to a new DXC 12.

Commands are used and provided by an external control system 16 that instructs network control 36 to initiate, for example, a remote spares verification (RSV) process 56. The RSV process 56 is part of network control 36, and is described in reference to FIG. 5. External control systems 16 may also instruct network control 36 to initiate an audit of one or more DXC devices 12. This audit is performed by the NIFTE 46 component of network control 36, but the command message is sent to a network control coordinator (NCC) 58 component for distribution. This command is a request for a data read of the RTNDD 40, to be performed by the NIFTE 46.

Figure 7:
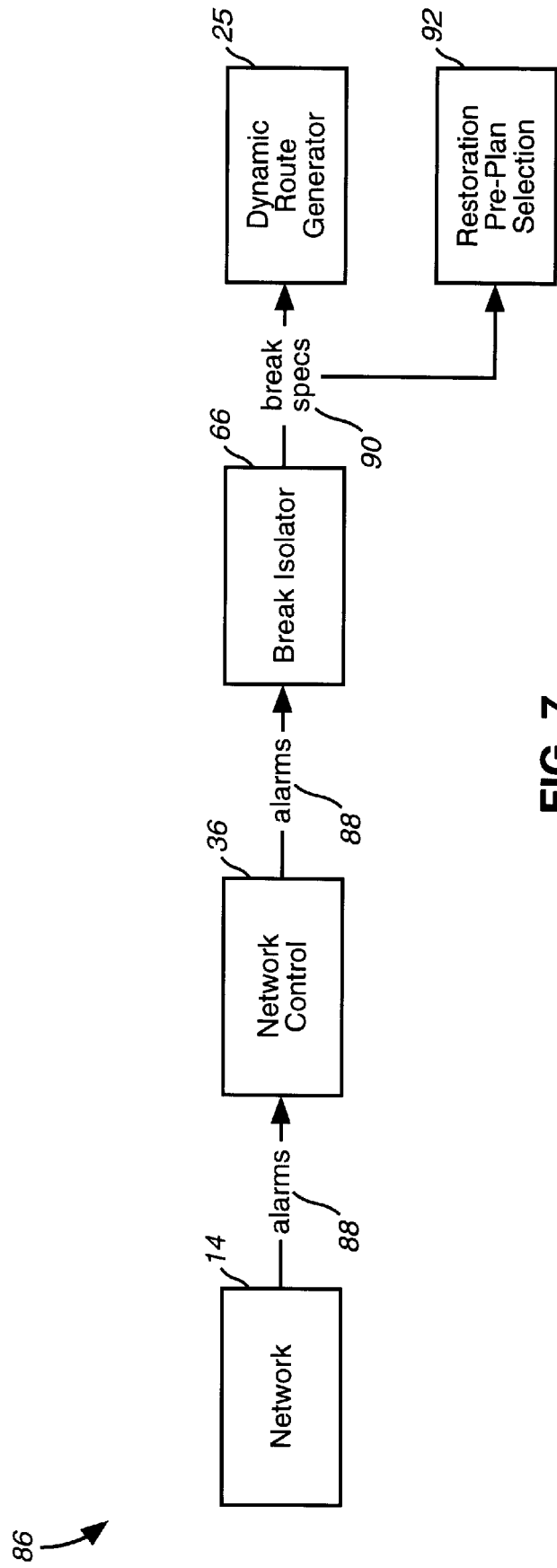
FIG. 7 is a block diagram depicting the steps of processing and responding to alarms during a network outages of the present invention.

The NCC 58 serves as the main interface and message distributor for the network control 36 component, and is described in reference to FIG. 7.

Commands received by control manager 50 and distributed to the restoration control 34 interface include the following: The change execution state command as described previously, the change DRG mode command, which instructs restoration control 34 to enable or disable DRG 25. When DRG 25 is enabled, restoration control 34 performs dynamic restoration. When DRG 25 is disabled, restoration control 34 performs pre-plan restoration. Control manager 50 tracks the current DRG 25 mode as an internal data parameter.

After an outage is cleared, a normalization plan is sent to the restoration control 34 to return the DXCs 12 to their original state prior to the outage. This normalization plan is sent from the user display (20) system (PC) or (WS) directly to the restoration control 34. In addition to responses to change execution state and change DRG mode commands, the control manager 50 receives from restoration control 34 a restoration status message. This message provides data on the current status of a restoration process.

The topology update manager (TUM) 60 is responsible for updating data in the RTNDD 40. TUM 60 receives external data on network 14 topology from RTT 18. TUM 60 makes appropriate updates to RTNDD 40. The TUM 60 also receives messages from the NIFTEs 46 indicating that the results of a DXC 12 audit are not consistent with what is reflected in the RTNDD 40 for that DXC 12. While the NIFTE 46 is responsible for making some updates to RTNDD 40, the TUM 60 is responsible for making other updates. If the NIFTE 46 notes an inconsistency of data in the RTNDD 40 for which it is not responsible for updating, it will send a request to the TUM 60 to reconcile the data in the RTNDD 40.

An external server 62 may serve as a front-end focal point to control manger 50 for receiving input from and providing output to external systems. The external server 62 may be incorporated into the control manager 50. Additional messages sent directly by this component, as shown in FIG. 5, may include a command that registers an external system as a client for alarms received. External systems, as well as internal RTR 10 processes, can register to receive certain types of alarms. When network control 36 receives alarms from DXCs 12, it determines a list of alarm recipients, and distributes the alarms accordingly.

The external server 62 may send commands to the NCC 58 that request the NIFTEs 46 to issue a port connect or port disconnect command to a DXC 12. While the restoration control 34 component generates these commands to implement a restoral route, RTR 10 may also receive these commands from external control systems 16.

Figure 6:
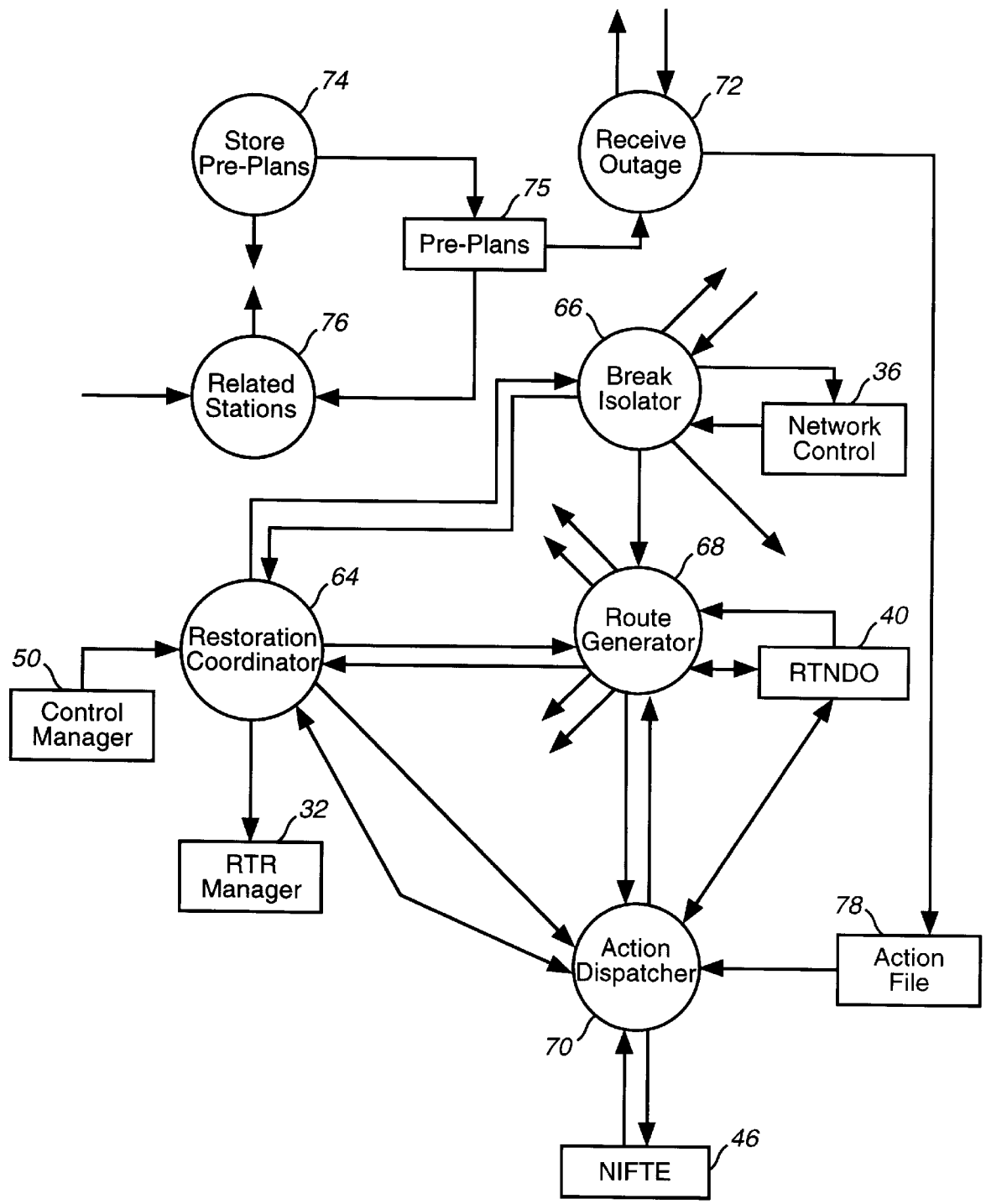
FIG. 6 is a block diagram of a restoration control component of a network restoration system of the present invention.

FIG. 6 illustrates in detail the logical architecture of restoration control 34. Restoration control 34 is comprised of four key components, restoration coordinator 64, break isolator 66, route generator 68, and action dispatcher 20.

The restoration coordinator 64 serves as the main interface for all processes within restoration control 34. When RTR 10 starts up and is placed in primary execution state, the restoration coordinator 64 establishes communication with each of the other restoration control 34 process components. The restoration coordinator 64 receives commands from external control systems 16 via the control manager 50, and distributes them to the appropriate processes within restoration control 34. Distribution of commands to other processes often requires a specific timing and sequence, which the restoration coordinator 64 controls. The restoration coordinator 64 also communicates restoration status to the RTR manager 32.

The break isolator 66 is responsible for receiving DXC 12 alarms from network control 36, identifying the trunk 30 impacted (both traffic trunks and spares), and isolating the location of the outage, or break.

When a network 14 outage occurs, DXCs 12 sends unsolicited alarms to RTR 10. These alarms are received by NIFTEs 46 and passed on to the break isolator 66 in messages. The break isolator 66 collects alarms and maintains a list of active alarms.

The break isolator 66 registers for receipt of all alarms and it sends a message to network control 36. This message instructs network control 36, and specifically the NIFTEs 46 to send the break isolator 66 alarms generated by DXCs 12. NIFTEs 46 return a response message to confirm. The break isolator 66 then begins receiving alarms from the network 14. Alarms will be received even when no outage has occurred. These alarms are spurious, and may be generated for a variety of reasons, such as detection of a weakened signal.

The break isolator 66 applies certain criteria to active alarms to determine if an outage has occurred. Such criteria includes the number of alarms received in a time interval. The break isolator 66 also waits a predetermined time before declaring an outage. The break isolator 66 uses topology data from the RTNDD 40 to correlate alarms to determine if multiple alarms are related and uses tunable thresholds to determine if alarms are a probable result of an outage. The break isolator 66 then determines the location of the outage to a trunk segment 30 between two restoration devices, typically DXCs 12. The break isolator 66 then sends this specification of the outage to the route generator 68. If DRG 25 is disabled, and restoration pre-plans are to be used, the break isolator 66 tracks the list of impacted trunks to ensure each one is successfully restored by a pre-plan.

The route generator 68 receives break specifications from the break isolator 66 and generates restoral routes, if DRG 25 is enabled.

The route generator 68 first sends a restoration status message to the restoration coordinator 64, indicating that restoration is in process. This triggers the restoration coordinator 64 to notify the control manager 50 to place RTR 10 in a readiness mode of "alert."

Route generator 68 reads data from RTNDD 40, and uses this data to determine an optimal restoral route for each impacted trunk based upon traffic trunk priorities. This determination should take into account the costs of different restoral routes. Such cost data is derived. For example, based upon capacity type number of segments, distance, and the number of connections.

RTNDD 40 is also queried for a list of available spare trunks that can be used for restoral routes. If a break specification is received for a spare trunk, the route generator 68 updates RTNDD 40 to indicate this spare is broken and is not available for restoral routes.

When a restoral route is determined, route generator 68 identifies each port on each DXC 12 that is needed for the restoral route and formulates commands needed to implement the route which generally comprise port connects and disconnects in DXCs 12. These commands are in a generic format, in that they refer to DXC 12 devices and ports in a generic manner. These generic commands will be translated to actual commands needed for specific DXC 12 by the NIFTEs 46. Route generator 68 creates a file of these commands, and then provides this file to the action dispatcher 70.

The action dispatcher 70 receives commands from the route generator 68 for implementing the restoral route. The action dispatcher 70 distributes these commands directly to the NIFTEs 46, bypassing the NCC 58 for performance reasons. Since there is an individual NIFTE 46 process running for each DXC 12, the action dispatcher 70 must distribute individual commands to certain NIFTE 46 processes.

If DRG 25 is disabled, the route generator 68 does not perform any route generation. The action dispatcher 70 receives an action file 78 from receive outage 72. The action file 78 contains actions needed to implement a restoral route. These actions are in the same format as those received from route generator 68, except they have been specified by a restoration pre-plan. The action dispatcher 70 distributes these commands to individual NIFTEs 46.

Restoration control 34 also consists of other components used in the pre-plan restoration process. load preplans 74, and receive outage 72 are used to download appropriate restoration pre-plans 75 from an external control system 16, and submit them to action dispatcher 70 for implementation. Thus, the present invention combines the ability to execute pre-plans with a dynamic network restoration system on the same platform. Restoration control 34 is responsible for initiating the main processing loops of the other components. This is performed at startup of RTR 10 by receiving a message from the control manager 50.

Alternative to the processes previously described, the break isolator 66, when it has compiled a list of impacted trunks, may present this list to the user via the user display 20. RTR 10 then allows the user to either select a pre-plan 75 for each trunk or to select dynamic restoration.

If the user selects DRG 25, then the break isolator 66 sends the break specification to the route generator 68. The route generator 68 proceeds with dynamic restoration, as previously described. If the user selects a pre-plan 75, then the break isolator 66 does not need to determine the location of the impacted trunk segments 30. There will be a pre-plan 75 provided for the outage. These pre-plans 75 are downloaded and provided by the load pre-plans 74 and receive outage 72 components. They are provided directly to the action dispatcher 70 in an action file 72. However, the break isolator 66 maintains the list of impacted trunks to ensure each one gets restored. If a pre-plan 75 does not get implemented successfully, the break isolator 66 will present the impacted, unrestored trunks to the user again, and allow the user to select either another pre-plan 75, or dynamic restoration.

In FIG. 7, a block diagram illustrating an example of the present invention's use in a network restoration system 8, and is denoted generally as 86. Specifically, this software component, the break isolator 66, locates and isolates breaches in network integrity.

Break isolator 66, receives port alarms 88 from a network 14. These alarms 88 are generated on the ports 89 of DXCs 12 used for network restoration. The ports 89 of a DXCs 12 are built such that if they detect a loss of signal, a degradation of signal, or a change in signal type, they will generate an alarm 88. Alarms 88 can generally indicate what has been detected, and therefore are of different types. However, due to the complex and sensitive nature of communications networks, many alarms 88 are generated spontaneously as a result of fluctuations in signals or other insignificant state changes, and not as a result of the previously mentioned factors. These are referred to as spurious alarms 88.

The restoration system 8 of the present invention can distinguish among all types of port alarms 88, including spurious alarms 88, in order to identify which alarms 88 are a direct result of a network 14 outage. When a DXC 12, or other device, generates a port alarm 88, the alarm 88 is transmitted to RTR 10. Any means for such transmission may be used. Network control 36 serves as a focal point of receipt of such alarms 88 for the RTR 10 system, and provides functions such as communications management and data protocol translation. In essence, however, all alarms 88 received by network control 36 are passed on to the break isolator 66.

The break isolator 66 receives all alarms 88 and performs various analysis processes to identify all trunks 30 impacted by an outage 104, and to isolate the location of the outage 104 between the nearest two DXCs 12. The break isolator 66 process performs break isolation for restoration control 34. The break isolator 66 also identifies if there is possible more than one outage 104. The break isolator 66 takes the reported alarm 88 received from within the network 14 and determines the trunk 30 associated with the alarm 88 by using the RTNDD 40. An alarm 88 describes a port 89 on a DXC 12 and the break isolator 66 retrieves the data associated with the port 89. The RTNDD 40 which provides configuration information regarding the DXCs 12 that are affected and the ports 89 which are affected. The data the break isolator 66 receives from the RTNDD 40 is the trunk 30 identification, priority of the trunk 30, the service date of the port 89, and the current alarm state. The break isolator 66 retrieves this data as well as additional data associated with the effected trunk 30, such as trunk 30 type and whether the trunk 30 is used as a spare or traffic trunk 30.

The break isolator 66 will take this information and begin to create a broken trunk list 100. Each instance of an alarm is logged into a broken trunk list 100. If an instance of an alarm 88 for a trunk 30 does not exist the break isolator 66 will create a new entry. The break isolator 66 will also build a description of the route of the trunks 30 and ports effected. The break isolator 66 maintains a broken trunk list 100 of active alarms 88 and, if DRG 25 is enabled, break isolator 66 attempts to determine break specification 90 information for the alarms 88 in the list created. When a break specification 90 is identified, the specification is sent to the DRG 25. If DRG 25 is not enabled, this process maintains the list of active alarms 88 but does not isolate break specifications 90 from the list.

The break isolator 66 is responsible for determining break specifications from DXC 12 alarms 88 and specifying internal identifiers for the breaks. The data provides a trunk identification and then the table of impacted trunks 30 is searched to determine weather this trunk 30 identification is found. If the trunk identification is found in the table the break isolator 66 will release these traffic trunks 30 to the DRG 25, if DRG 25 is enabled.

The break isolator 66 produces break specifications 90 that specify each trunk 30 that requires restoration, and the restoration DXCs 12 on each trunk 30 between which restoration is needed. These are the two DXCs 12 between which the break isolator 66 has isolated the outage 104, usually the two DXCs 12 nearest the outage 104.

The break specifications 90 produced by the break isolator 66 are then sent to the DRG 25. A DRG 25 is a software component in a dynamic restoration system 8 that is responsible for generating restoral routes, based on the break specifications 90 produced by the break isolator 66. For a pre-plan system of restoration, the break specifications 90 are provided to a restoration pre-plan selection process 92. Restoration pre-plan selection 92 is a component that can either present a list of break specifications 90 to a user, who then selects pre-plans for restoration, or provide the break specifications 90 to an automated system that selects pre-plans for restoration.

The break specifications 90 may be provided by the break isolator 66 one at a time, for each trunk 30, or as a group. The trunks 30 identified are presented in order of priority. Priority is determined based on the type of traffic carried, and therefore the priority that the traffic has for being restored. Break specifications 90 for trunks 30 are released to the DRG 25 or restoration pre-plan selection 92 only after the break isolator 66 has determined an outage 104 has actually occurred, thus avoiding any false restoration.

Figure 8:
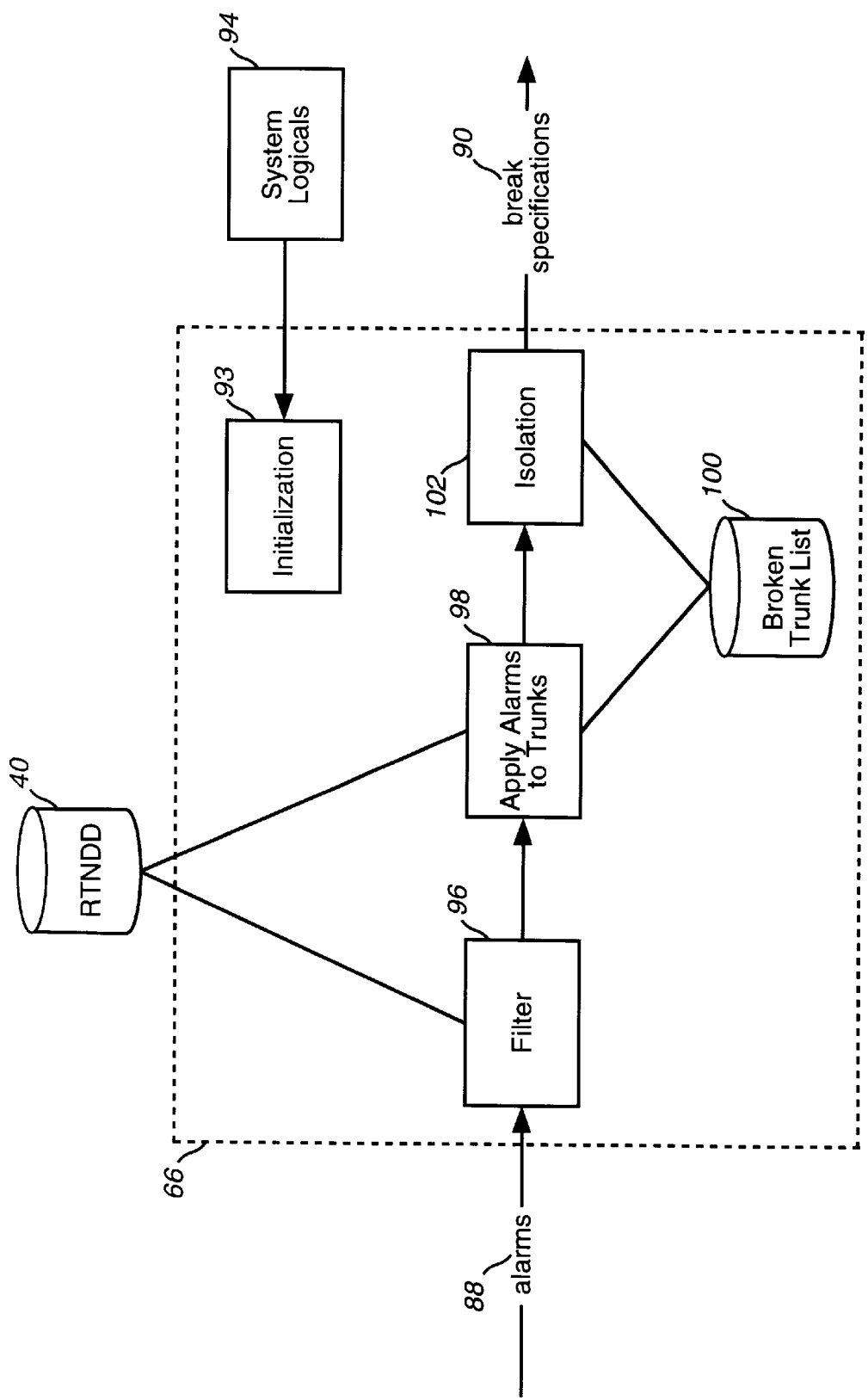
FIG. 8 is an architectural diagram of processing components within a break isolator of the present invention.

FIG. 8 illustrates in detail the internal and external architecture and process of the break isolator and is denoted generally as 90. The break isolator 66 has an initialization component 93. Initialization 92 performs several functions at startup.

The break isolator 66 runs on a computer and is preferably part of an overall network restoration system 8 that runs on the same computer. When this overall system 8 is started, the break isolator 66 is initiated. Initialization 93 reads a store of system logicals 94 from the overall system to determine run-time parameters. These may include parameters such as the mode of operation, and the execution state.

Initialization 93 also registers for receipt of all port alarms 88 from the network 14. This registration process depends on the embodiment of the overall restoration system 8. Generally, initialization 92 will register with the network control 36. This registration ensures that all alarms 88 collected from the network 14 will be sent to the break isolator 66.

Initialization 30 also collects all current alarms from RTNDD 40. Initialization 93 collects current alarms 88 from the RTNDD 40 at startup so that if the break isolator 66 crashes in execution during an outage 104, break isolator 66 can be restarted and can resume processing at the place that it left off.

The main processing loop of the break isolator 66 consists of three primary process components: a filter 96, an apply alarms to trunks 98, and isolation 102.

The break isolator 66, is constantly receiving alarms 88 of all types, including spurious alarms. This occurs even when there is no outage 104. These alarms 88 are first passed through a filter 96. The filter 96 is used to filter out uninteresting alarms 88, based on a device and port on which they were generated. They also indicate an alarm 88 type. The filter 96 queries the RTNDD 40 on the DXC 12 and port 89 identified in the alarm 88, for data on the current state and configuration of the DXC 12 and port 89. The filter 96 then applies certain criteria to determine if the alarm 88 should be dropped or passed on.

For example, the filter 96 will drop an alarm 88 if the alarm 88 is generated by a port 89 that supports a spare trunk segment 30. The filter 96 queries the RTNDD 40 for the type of trunk 30 (traffic or spare) for which the alarm 88 was generated. If the trunk 30 is a spare, the alarm 88 is not processed further, but it is kept in a separate table and passed onto the DRG 25, so that the DRG 16 will know not to use that spare segment in generating a restoral route.

If an alarm 88 is not of sufficient priority, filter 96 will drop the alarm 88. The priority is obtained from the RTNDD 40, based on the trunk 30 of the DXC 12 and port 89 that generated the alarm 88, and reflects a priority given to the trunk 30 based on the type of traffic it carries. In an alternative embodiment, a priority indicator may be added to the alarm 88 itself, obtained from a database internal to the DXC 12. The filter 96 will make a judgement as to whether or not to apply an alarm 88 and create an instance of an impacted trunk.

Generally, the break isolator 66 is interested in alarms 88 indicating a complete loss of signal. Alarm types are indicated in the alarm messages received by the break isolator 66. The filter 96 may be programmed so that alarms 88 that result from a simple degradation of signal (i.e. low signal-to-noise ratio), a change in signal type, or other types of alarms 88, are dropped. In this criteria, only alarms 88 indicating a complete loss of signal are assumed to be the result of an outage 104, and are processed further.

The alarms associated with an outage 104 can occur at random, so the filter 96 can be used to limit the restoration process by requiring a plurality of trunk 30 segment failures before an instance in the broken trunk list is created.

Other criteria may be included, depending on the nature of DXCs 12 in the network 14 and the types of alarms 88 they may generate.

Alarms 88 that pass through the filter 96 are input to step 98, which applies alarms to trunks 30. In this step, the topology of each trunk 30 in alarm 88 is built in local memory from data retrieved from the RTNDD 40. This is reflected in a broken trunk list 100, which identifies all trunks 30 in alarm for a current outage 104. Input alarms 88 are then applied by indicating the corresponding port in the trunk's 30 topology.

When an alarm 88 is received in step 98, a trunk 30 identifier for the DXC 12 and port 89 generating the alarm 88 is obtained from the RTNDD 40. If this is the first alarm 88 received for that trunk 30, than an instance of the trunk 30 is built in the broken trunk list 100. This instance consists of an array of all DXCs 12 and ports 89 that comprise the trunk 30, in logical order. This data reflects the logical topology of the trunk 30 and is obtained from the RTNDD 40.

Figure 9:
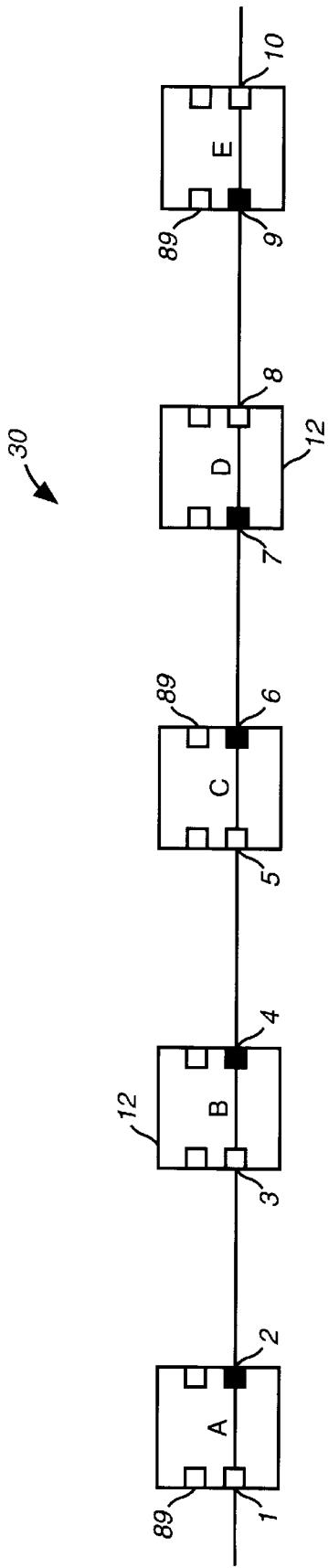
FIGS. 9–15 are schematic illustrations of switching elements with a network.

For example, referring to the network segment illustrated in FIG. 9, a trunk 30 comprises a plurality of DXCs 12 (DXCs A–E), and a plurality of device ports 89 (ports 1–10). An instance of this trunk 30 may be represented in the broken trunk list 100 as follows:

(A1, A2, B3, B4, C5, C6, D7, D8, E9, E10)

Once the trunk 30 instance has been built, the alarm 88 is applied to it by indicating the port 89 (corresponding to the alarm 88 received) as being in alarm 88 in the trunk 30 instance array in the broken trunk list 100. When additional alarms 88 are received for this trunk 30, as determined by querying the RTNDD 40 with the DXC 12 and port 89 number of the alarm 88 and obtaining a trunk 30 identifier, they are applied in the same manner, by indicating the corresponding port 89 in the trunk 30 instance as being in alarm 88.

In the example shown in FIG. 9, ports 89 in alarm 88 are shaded. If ports 89 in alarm 88 are indicated with an "i", in the trunk instance in the broken trunk list 100, then an instance of the trunk 30 shown in FIG. 9 may be represented in the broken trunk list 100 as follows:

(A1, A2i, B3, B4i, C5, C6i, D7i, D8, E9i, E10)

In addition to receiving alarms 88 from the network 14, the break isolator 66 can also receive alarm 88 clears. An alarm 88 clear is generated by a device port when the cause of a previously generated alarm 88 vanishes. For example, if a port 89 detects a loss of signal and generates an alarm 88, that port 89 will generate an alarm 88 clear when it detects the original signal again.

In the case of a outage 104, a port 89 will detect a complete loss of signal and generate an alarm 88 indicating such. RTR 10 will receive the alarms 88, and perform restoration by rerouting traffic to circumvent the outage 104. Usually, a repair crew will fix the cause of the outage 104, such as a cut fiber. When that happens, the ports 89 that generated the alarms 88 will again receive a signal. These ports 89 then generate an alarm 88 clear, which is received by RTR 10. RTR 10 can then normalize the network 14.

When the break isolator 66 receives an alarm 88 clear, it passes the alarm 88 clear through the filter 96, in the same manner as alarms 88. When step 98 receives the alarm 88 clear, it applies the clear to the trunk 30 instance in the same way that it applies alarms 88, except that it designates the corresponding port 89 as not being in alarm 88. For example, suppose that for the trunk 30 shown in FIG. 9, A2 has generated an alarm 88 clear, which has been received by step 98. The instance of the trunk 30 in the broken trunk list 100 may now be represented as follows:

(A1, A2, B3, B4i, C5, C6i, D7i, D8, E9i, E10)

In this way, step 98 can keep track of when a trunk 30 in alarm 88 is completely cleared, and thus ready for network 14 normalization.

If step 98 receives an alarm 88 clear for a port 89 that is not found in the broken trunk list 100, the alarm 88 clear is simply dropped.

When an outage 104 occurs and alarms 88 make it to step 98, the broken trunk list 100 is compiled, listing all the trunks 30 impacted by the outage 104. The broken trunk list 100 is then given a break identifier. This break identifier designates a particular instance of the broken trunk list 100 as reflecting a single outage 104. In this way, the break isolator 66 can determine the scope of an outage 104.

Trunks 30 may be dropped from the broken trunk list 100 for a number of reasons. When a trunk's 30 first port alarm 88 is received, step 98 queries the RTNDD 40 to identify all ports 89 that comprise the trunk 30. The RTNDD 40 contains data indicating internal cross-connects of each port 89. If step 98 finds in RTNDD 40 that a port 89 along the trunk 30 is not cross-connected to anything, step 98 assumes this trunk 30 is not carrying traffic. Step 98 will therefore drop the trunk 30 from the broken trunk list 100.

Also, trunks 30 may be dropped from the broken trunk list 100 if the alarms 88 received do no reflect topology consistent with that reflected in the RTNDD 40. This may indicate that the trunk 30 has already been re-routed, perhaps by another restoration process.

When step 98 creates the first trunk 30 instance in the broken trunk list 98, it sets a timer. This timer is a tunable parameter of the break isolator 66. A user may select for how long it is set for, usually about 30–60 seconds. If another trunk 30 does not go into alarm 88 before this timer expires, then the broken trunk list 98 containing the one trunk 30 is dropped. This feature is used to filter out alarms 88 that may make it past the filter 21, but are nonetheless spurious. For example, an entire trunk 30 may lose its signal temporarily due to a weather condition only to regain the signal moments later. This feature ensures that spurious alarms for this trunk 30 do not trigger a restoration process. Another tunable parameter of this feature is the minimum number of trunks 30 needed in the broken trunk list 100. For example, instead of being set to one, as stated above, a timer may be reset each time a third trunk 30 has been added. If a fourth trunk 30 is not added when the timer expires, the broken trunk list 100 is dropped.

When all trunks 30 impacted by an outage 104 are completed in the broken trunk list 100, step 98 releases the broken trunk list 100 to the third primary process component, isolation 102. To determine when a broken trunk list 100 is completed, a second timer in the break isolator 66 gets reset each time an alarm 88 passes through the filter 96. This timer is also a tunable parameter, and may be set to any interval, commonly 30 seconds. It is preferable to set this second timer when a minimum number of trunks 30, perhaps three or four have been added to the broken trunk list 100. This minimal number of trunks 30 is yet another tunable parameter.

The combination of these two parameters can be used in the following way. By setting the minimum number of trunks 30 to three and the timer to 30 seconds, when three trunks 30 have been added to the broken trunk list 100 during an outage 104, the timer is set. Each time a new alarm 88 passes through the filter 96 and is received by step 98, the timer is reset. If the timer expires before a next alarm 88 is received, the assumption is made that all alarms 88 from the outage 104 have been received. At this time the broken trunk list 100 is released to isolation 102.

As an additional aspect of the present invention, when step 98 determines the break is complete and releases the broken trunk list 100 to isolation 102, the break isolator 66 sends a message to the RTR 10 requesting a change in operational mode. This operational mode may be either a ready mode or an alert mode. In ready mode, no outage is assumed and processing proceeds as normal, with much background activity occurring. In alert mode, an outage 104 is assumed. To maximize the efficiency of the restoration process, all unnecessary processing ceases in alert mode so that system resources may be dedicated to restoration processing. The break isolator 66 can send a message to the RTR 10 requesting that the system 8 go into alert mode, when the broken trunk list 100 is released, since this represents the point at which an outage 104 is declared.

Isolation 102 receives the broken trunk list 100 as input and isolates the location of the outage 104 for each trunk 30. This isolation is ideally to a segment between the two restoration DXCs 12 nearest an outage 104 (i.e., a segment with no intervening DXCs 12). In some anomalous cases, however, isolation may be made to a segment with intervening DXCs 12. Some possible scenarios showing how the isolation process 102 is performed, are shown in FIGS. 10 through 15. In these figures, shaded ports 89 represent ports 89 in alarm 88.

Isolation 102 extracts from the broken trunk list 100 each trunk 30 instance, which is represented by an array of device ports 89, with ports 89 in alarm 88 as indicated. Isolation 102 isolates the outage 104 between two DXCs 12. Isolation 102 then produces a break specification for each trunk 30, and sends this break specification 90 to the downstream process, either a DRG 25 or a restoration pre-plan selection 92.

The break specification 90 produced by isolation 102 is an array of each DXC 12, in logical order, that comprises a trunk's 30 topology. This array also specifies the outage 104 location by denoting the two DXCs 12 between which the outage 104 has been isolated. With this specification, the DRG 25 can immediately identify which two DXCs 12 it must restore traffic between, and if a restoral route cannot be found between those two DXCs 12, other DXCs 12 will need to be.

Figure 10:
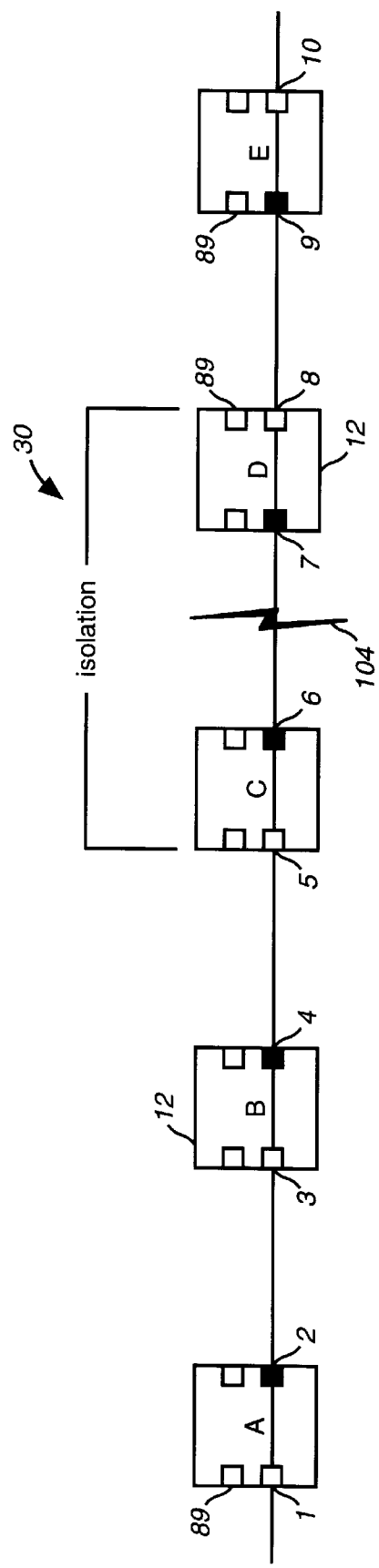

In FIG. 10, an outage 104 has occurred between two DXCs 12 denoted as C and D. The trunk 30 instance received by isolation 102 may be represented as follows:

(A1, A2i, B3, B4i, C5, C6i, D7i, D8, E9i, E10)

indicating with an "i" which ports 89 are in alarm 88.

FIG. 10 illustrates a common feature of DXC 12 networks 14 that is exploited by isolation 102. Only ports 89 that face an outage 104 will generate an alarm 88. Therefore, for outage 104, only A2, B4, C6, D7, and E9 will generate an alarm 88, since only these ports 89 face the outage 104.

Isolation 102 uses this fact to determine the two nearest DXCs 12 to outage 104. The two DXCs 12 will then be used as end points for restoration. Isolation 102 easily determines that outage 104 must have occurred between C and D, since C6 and D7 are adjacent, face each other, and are both in alarm 88. Isolation 102 does not need to specify the ports 89, but only the DXCs 12 themselves. Therefore, for the case shown in FIG. 10, isolation 102 would produce a break specification 90 as follows:

(A, B, Ci, Di, E)

where C and D are denoted as the impact points, or those DXCs 12 between which restoration must be performed.

Figure 11:
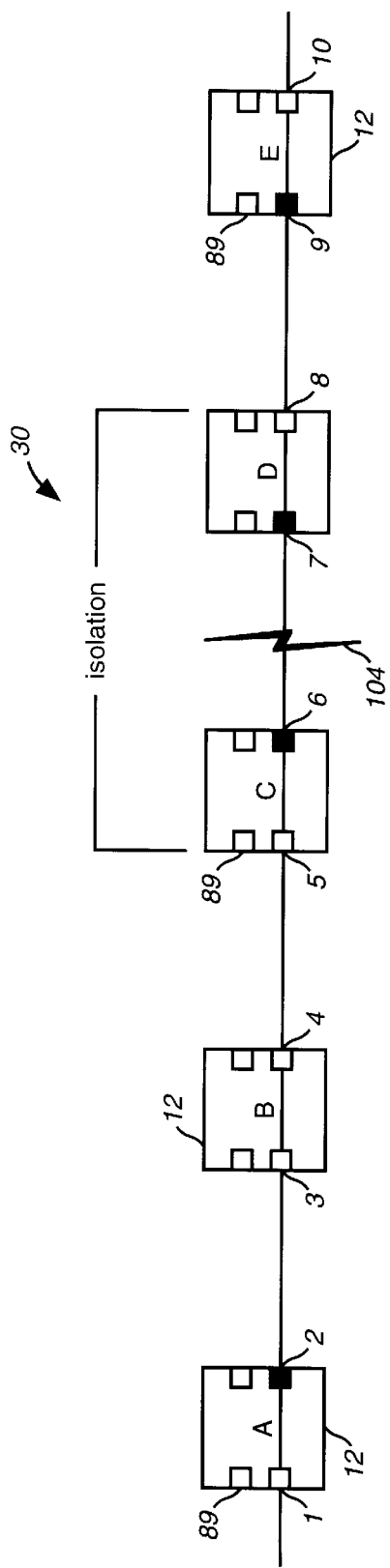

FIG. 11 illustrates an anomaly that may occur. Outage 104 occurs as it did in FIG. 10. However, an alarm 88 for B4 is not received by isolation 102 for some reason. In this case, isolation 102 is programmed so that if such an absence of alarm 88 exists, it is overlooked. Isolation 102 walks the ports that are in alarm 88 to the point where they face each other, and isolation of the outage 104 is made to between C and D. Again, the break specification would be:

(A, B, Ci, Di, E)

Figure 12:
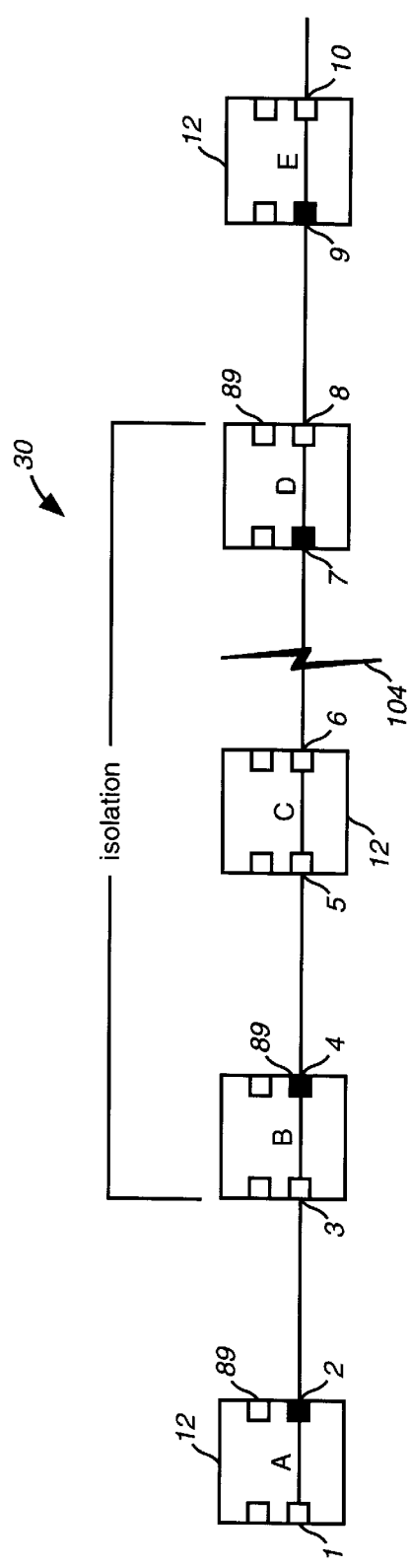

FIG. 12 illustrates another anomaly that may occur. This time, one of the DXCs 12 nearest the outage 104, C, does not generate an alarm 88. In this case, isolation 102 walks the ports that are in alarm 88 to the point where they face each other. This point is between B and D. However, isolation past this point is not possible since the intervening DXC 12, C, did not generate any alarms 88. Isolation 102 is made between B and D. The break specification 90 would be:

(A, Bi, C, Di, E)

in which B and D are denoted as the impact points, but C is still identified.

Figure 13A:
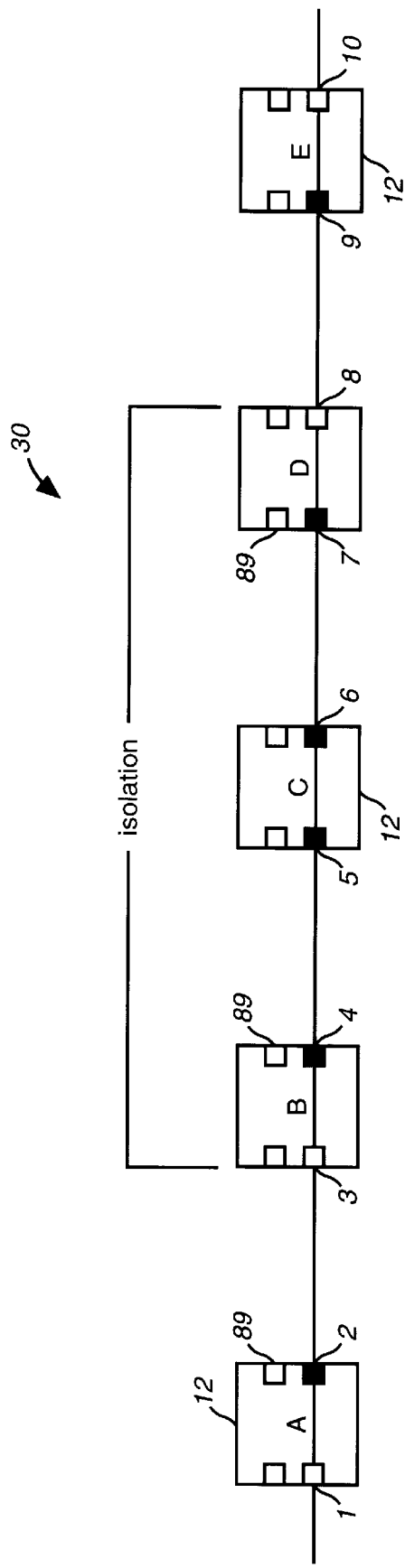

FIG. 13a illustrates yet another anomaly, in which two ports 89 of the same trunk 30 on the same DXC 12—C5 and C6—go into alarm 88. At first, it may appear that there are two outages 104, one between B and C, and another between C and D. This may be the case, however, isolation must be made between B and D, because C cannot be used for restoration in this case due to the possible outage 104 on either side of C.

Figure 13B:
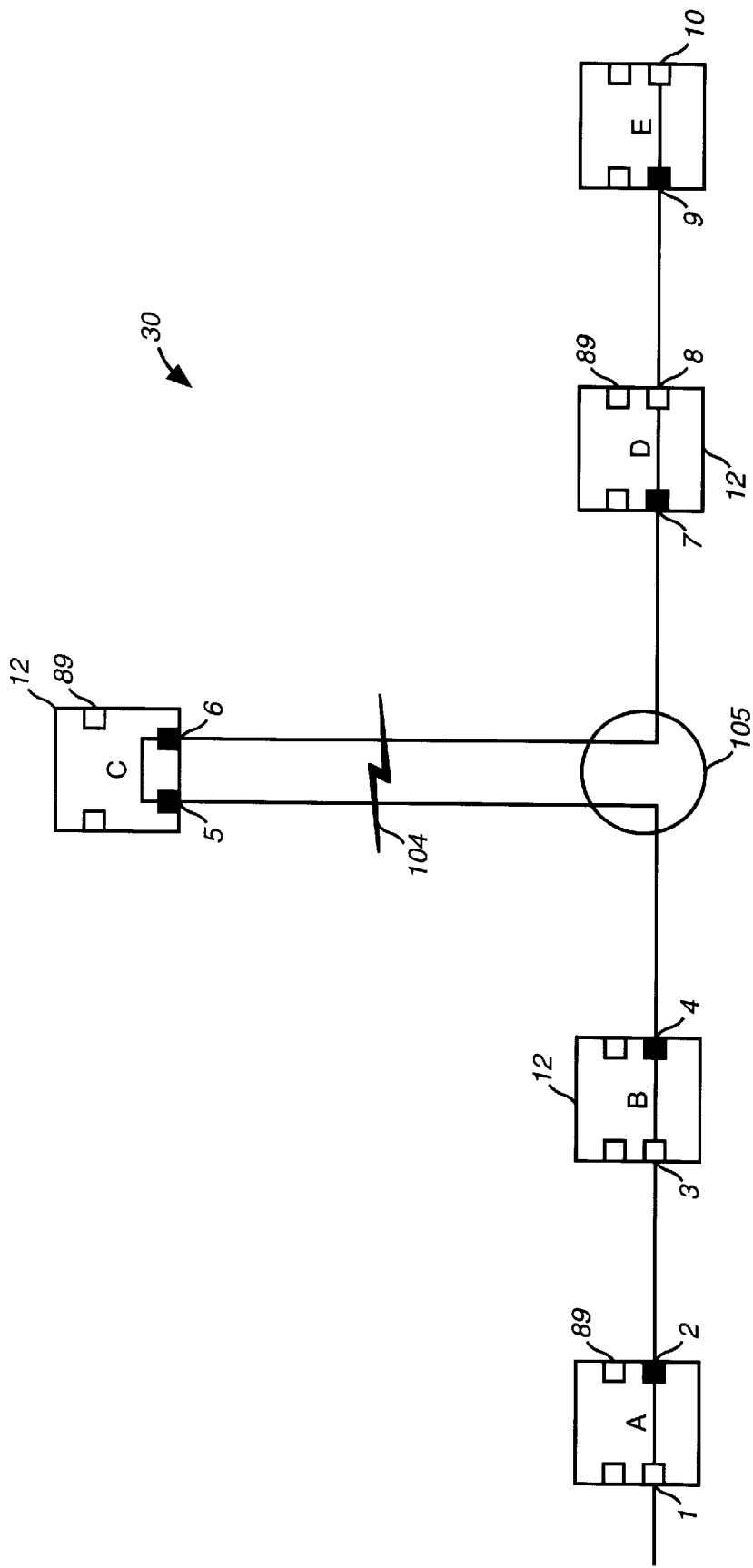

The scenario in FIG. 13a may have another cause, as illustrated in FIG. 13b, which shows the exact same scenario as FIG. 13a. In FIG. 13b, only one outage 104 has occurred. A portion of the trunk 30 segment between B and C shares the same physical route as a portion of the trunk 30 segment between C and D. This is made possible with an intervening node 105, which may be any telecommunications network terminal such as a digital repeater site. When outage 104 occurs, it impacts both of these segments. Alarms 88 are generated on both C5 and C6, causing the situation shown in FIG. 13a.

Again, isolation must be made between B and D, as C cannot be reached and therefore cannot be used for restoral routes.

Figure 14:
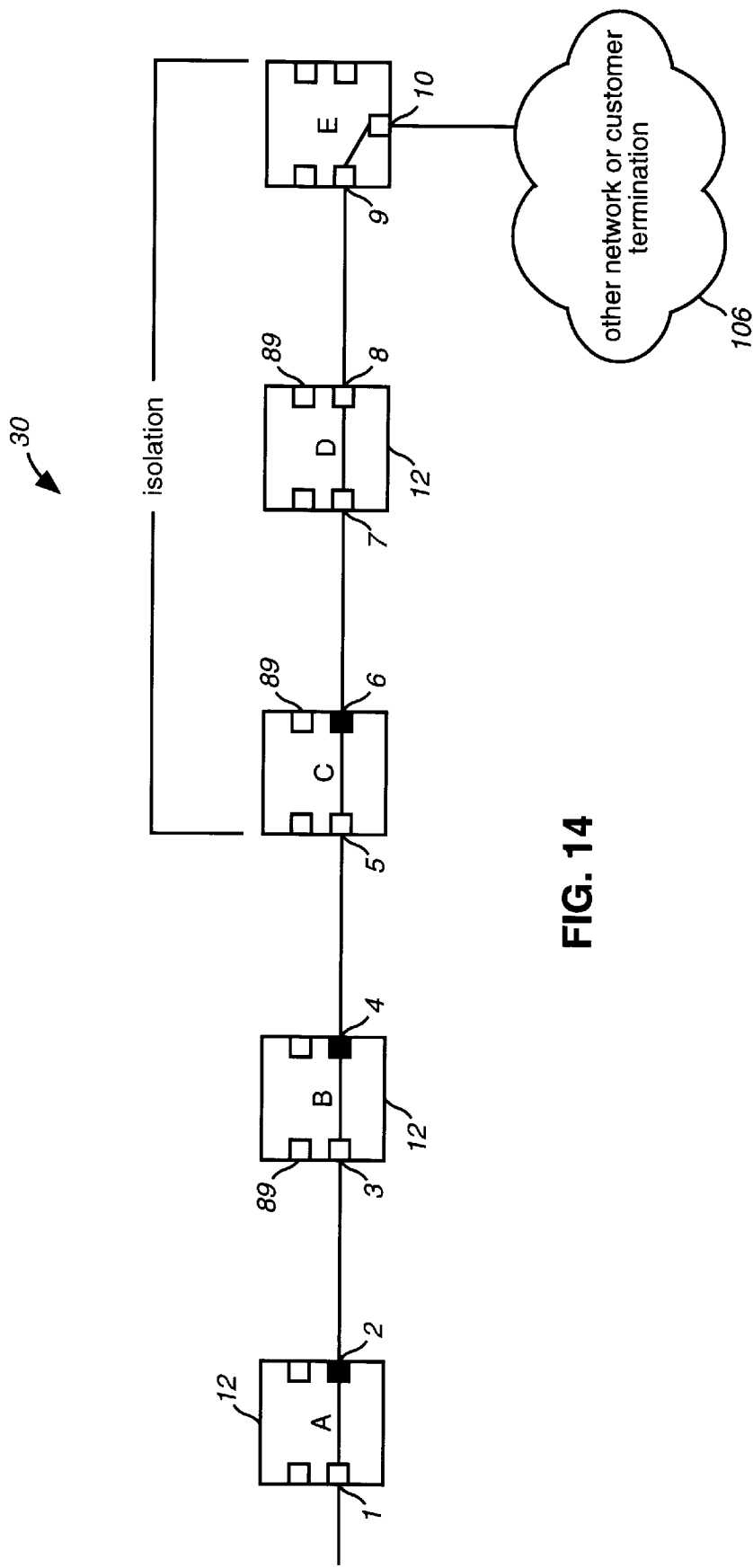

FIG. 14 illustrates a situation in which all alarms 88 face in one direction on the trunk 30. The trunk 30 terminates the carrier's network 14 at E, and terminates to either another carrier or to a customer 106. This is nominal trunk 30 architecture for a telecommunications network. Thus, E represents the end of the trunk 30 on the present carrier's network 14. In this case, the outage 104 may have occurred at a point 106 beyond the carrier's network 14, or the outage may have occurred between C and E, but both D and E failed to generate an alarm 88 for some reason. The outage 104 cannot be determined by alarms received.

If alarms 88 are received in the configuration shown in FIG. 14, isolation 102 isolates the outage 104 from the point where the last alarm 88 is received to the point that the trunk 30 terminates on the carrier's network 14. Thus, isolation is made to between C and E.

Figure 15:
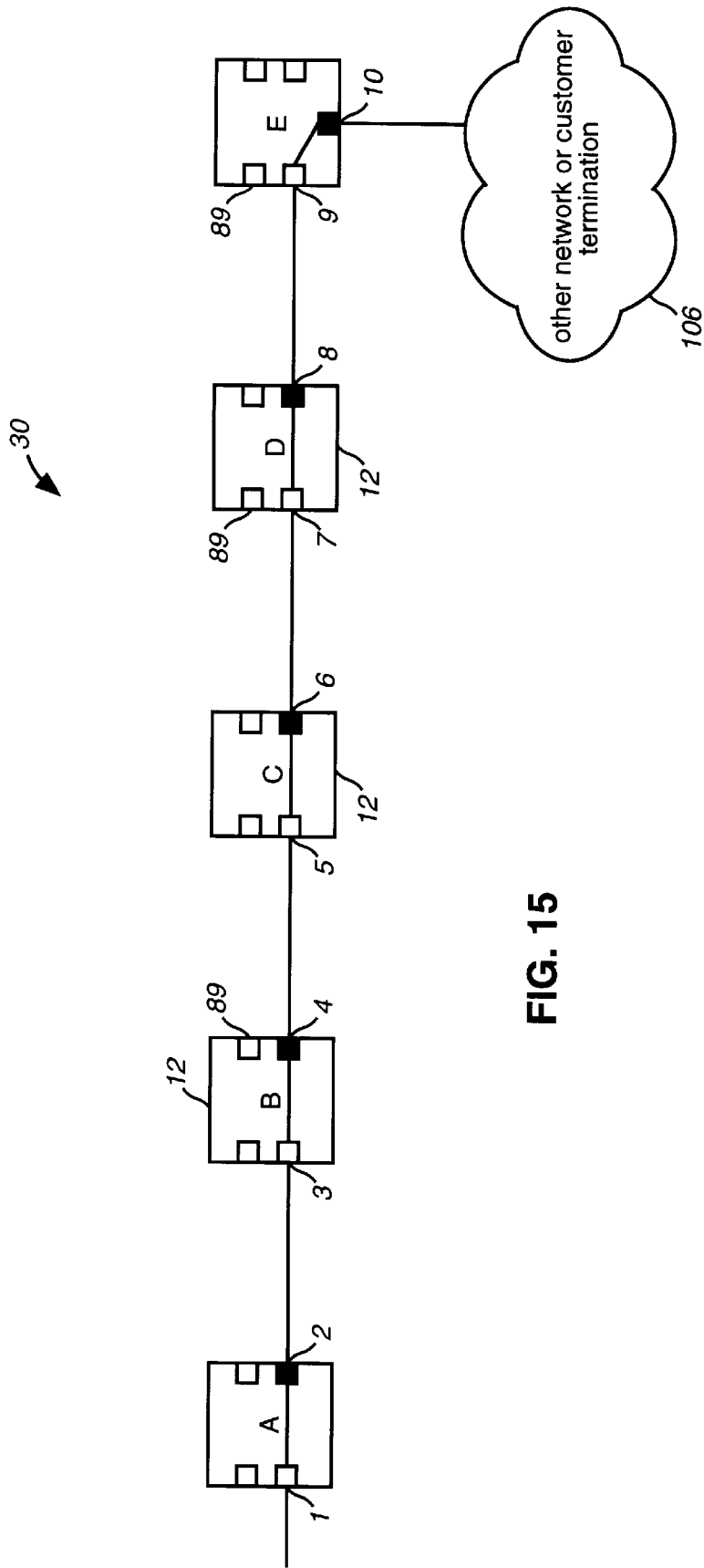

FIG. 15 illustrates a situation in which the alarms 88 are facing one direction on the trunk 30 and are received by isolation 102. These alarms 88 go all the way to the end of the trunk 30, at E. The last alarm 88, at E10, faces the trunk's 30 termination to another network that is beyond the control of the present carrier. This indicates an outage 104 that has occurred to a point beyond a carrier's own network 14. Since the present carrier only has control over its own network 14, it cannot isolate an outage 104 past this point. Therefore, isolation 102 drops this particular trunk 30 instance from the restoration process, and sends a message to the user of RTR 10 indicating that the outage 104 for this trunk 30 cannot be isolated.

After successfully isolating the location of the outage 104 as described above, isolation 102 produces the break specification 90. The break specification 90 identifies not only a trunk 30 identifier and the two DXCs 12 between which isolation has occurred, but also every device, in logical order, the comprises the trunk 30. This is so the DRG 25 can identify the extent of the outage 104, and can identify alternative end points for restoral routes.

The break isolator 66 produces a break specification 90 for each trunk 30. The break isolator 66 can release break specifications 90 one at a time, in order of priority. Alternatively, it can release an entire or partial group of break specifications 90 for an outage 104.

Also, the break isolator 66 send to the DRG 25 a specification identifying spare segments in alarm 88. This is so that the DRG 25 will not use these spare segments for restoral routes.

The break isolator 66 will keep the broken trunk list 100 after releasing break specifications 90 to the DRG 25. The break isolator 66 will indicate each trunk 30 on the broken trunk list 100 for which a break specification 90 has been released as being in the process of restoration. This ensures a broken trunk 30 does not get re-routed twice, and that each broken trunk 30 does get re-routed (restored). This is necessary because after a broken trunk 30 gets re-routed, it will continue to generate alarms 88, so long as the outage 104 remains. The break isolator 66 will thus continue to receive alarms 88 for this trunk 30. By querying the broken trunk list 100 and finding the trunk 30 on it in a state of restoration, the break isolator 66 will not perform a second isolation/ restoration process on this trunk 30.

When the cause of the outage 104 gets fixed, such as a fiber cable getting spliced, ports 89 in alarm 88 detect the signal restored and will clear their alarms 88. Alarm 88 clears are received by the break isolator 66. As they are received, they are applied to their corresponding trunks 30 in the broken trunk list 100 by step 98. When all alarms 88 on a trunk 30 have been cleared, it is dropped from the broken trunk list 100. At this point, the break isolator 66 can initiate a normalization process for that trunk 30. The normalization process restores the network 14 to its original configuration prior to the outage 104, and is usually performed by another component called the action dispatcher 70.

Figure 16:
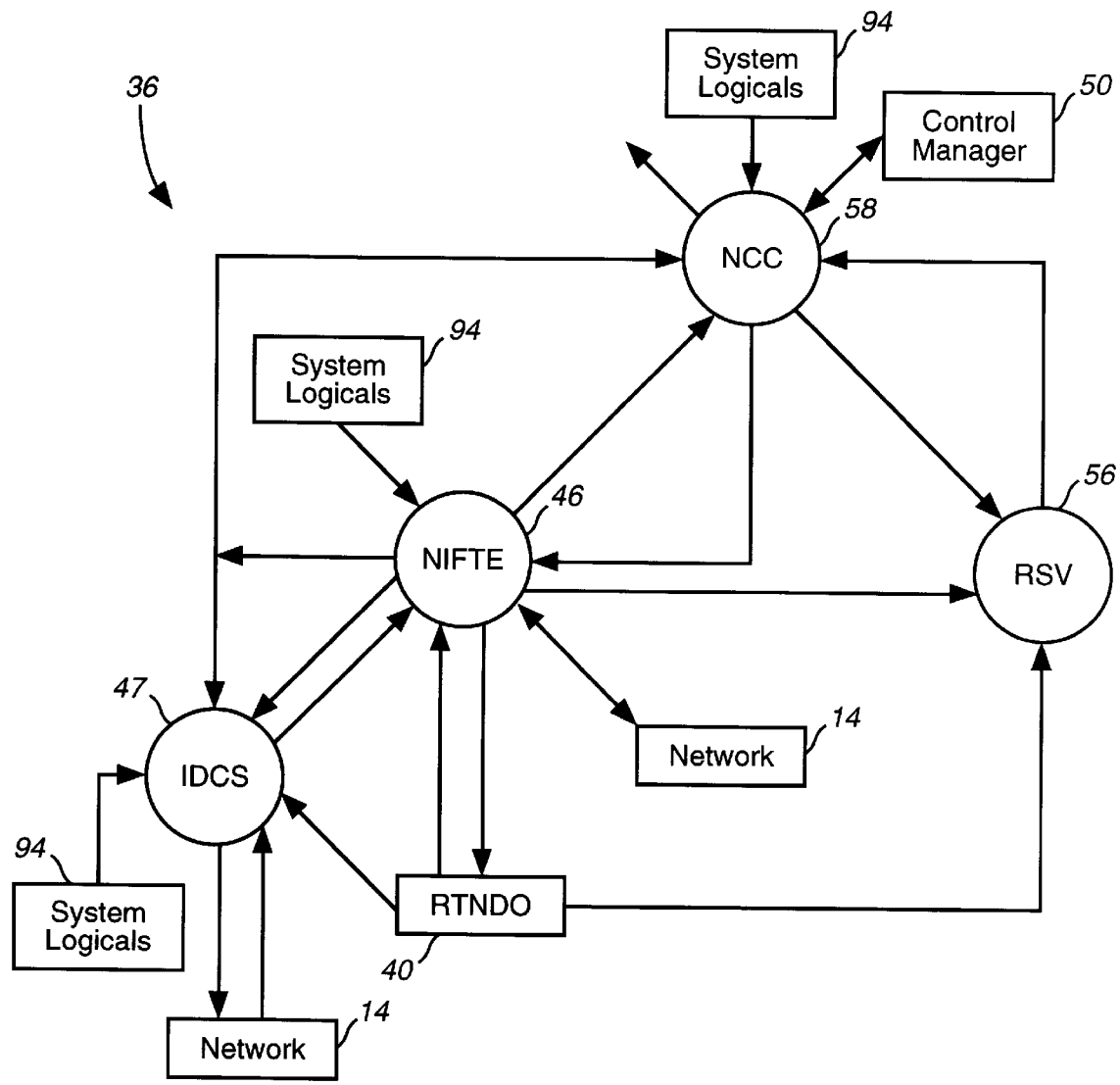
FIG. 16 is a block diagram of a network control component of a network restoration system of the present invention.

FIG. 16 illustrates in detail the logical architecture of network control 36. Network control 36 consists of four primary components, a NCC 58, NIFTE 46, a RSV 56, and an IDCS 47.

The NCC 58 serves as the main interface to and control for network control 36. NCC 58 is responsible for initiating the processing of the other components. In particular, NCC 58 initiates a distinct instance of a NIFTE 46 for each DXC 12 connection. NCC 58 also determines the current readiness mode of the RTR 10, and acts accordingly. When the RTR 10 readiness mode changes from "ready" to "alert", the NCC 58 sends messages to the other components to terminate automatic device audits and topology data updates.

The NCC 58 distributes messages to individual NIFTE 46. However, for the sake of quick performance in the event of an outage, the action dispatcher 70 can send messages directly to the mailboxes of individual NIFTE 46 processes.

The NIFTEs 46 are the interface to the DXCs 12. There is a distinct NIFTE 46 that runs for each DXC 12 that is controlled by RTR 10. NIFTEs 46 take action commands from the action dispatcher 70 that are in a generic, internal format. The use of a generic internal format shields the other components of RTR 10 from having to know the specific type of DXC 12 that is at each site. The NIFTE 46 queries the RTNDD 40 with a generic specification of a DXC 12. The RTNDD 40 returns with the specific format to the command needed, which depends on the type of DXC 12 in place. It also returns with the network address of the DXC 12.

The NIFTE 46 can also receive action commands from external control systems 16. These commands are received by the control manager 50, and the control manager 50 sends them either directly to the specific NIFTEs 46, or to the NCC 58. The NIFTEs 46 also manage the communications links with the DXCs 12. These include dual redundant binary data links to each DXC 12 via the network 14, as well as communications over a backup communications network 26.

The IDCS 47 provides the communications interface with the Backup Communications network 26.

The RSV 56 component performs an auxiliary function of the RTR 10. It solicits alarms from spare trunk segments in the network 14. When alarms are received, RSV 56 can determine how these trunks are connected. An alarm is generated by a port, and specifies whether that port is internally cross-connected to another port on the same device. Additionally, by comparing alarms from different ports on different devices, RSV 56 can determine if a port on one device is connected to a port on another device, to determine inter-connectivity.

RSV 56 then compares the topology it has determined from alarms with the topology that is reflected in the RTNDD 40. If the derived topology data for a spare is inconsistent with what is reflected in RTNDD 40, RSV 56 will mark the spare as unavailable for restoral routes. This prevents the route generator 68 from attempting to use the spare in a restoral route, which would most likely result in a failed route implementation since the actual connectivity of that spare is different from what the route generator 68 would assume.

Network control 36 uses a partial list of key messages and are described here in detail. For example, a change execution state command may be sent to the NCC 58. The NCC 58 in turn distributes the message to the other components. When change readiness mode command sent to the NCC 58, the NCC 58 distributes the message to the other components. The control manager 50 initiates or terminates, an individual NIFTE 46 process for a single DXC 12 by sending a message to NCC 58. A NCC force audit command may be sent to the NCC 58 by the control manager 50. The NCC 58 passes the message, translated as a NIFTE 46 force audit command, to the NIFTE 46. This command may be provided by an external control system 16, and instructs network control 36 to initiate an audit of one or more DXCs 12. This audit is performed by the NIFTE 46. A NIFTE alarm registration command may be sent to the NIFTE 46 by any number of systems, including external systems via the control manager 50 instructing the NIFTE 46 to send unsolicited DXC 12 alarms to the specified client. The break isolator 66 is a primary client. A NIFTE port connect command and NIFTE port disconnect command are issued by the action dispatcher 70 to individual NIFTEs 46. They specify port connect and disconnect actions in a generic format. The NIFTE 46 queries the RTNDD 40 to translate these commands to a format that is specific to the DXC 12 that particular NIFTE 46 supports.

A NIFTE 46 data update command is issued to the NIFTE 46 from any number of systems, including internal RTR 10 components, and requests a specific data update to be made to the RTNDD 40, to be performed by the NIFTE 46. A NIFTE data request command is issued to the NIFTE 46 from any number of systems, including internal RTR 10 components, and requests a specific data read from the RTNDD 40, to be performed by the NIFTE 46. A IDCS 47 gateway command is issued by the NIFTE 46 to the IDCS 47 gateway interface to send a command to a DXC 12 using the backup communications network 26. A binary device command is a command issued to a DXC 12 by the NIFTE 46, using the DXC's 12 binary data links accessed by network 14.

A binary device data command is a message sent by a DXC 12 to a NIFTE 46 over the network 14, and includes either a response to a command, a response to an audit, or an unsolicited alarm.

An IDCS 47 message command is issued to a DXC 12 by the NIFTE 46, using the backup communications network 26 via the IDCS 47. An IDCS 47 response is a message sent by a DXC 12 to a NIFTE 46 over the backup communications network 26, and includes either a response to a command, a response to an audit, or an unsolicited alarm.

Figure 17:
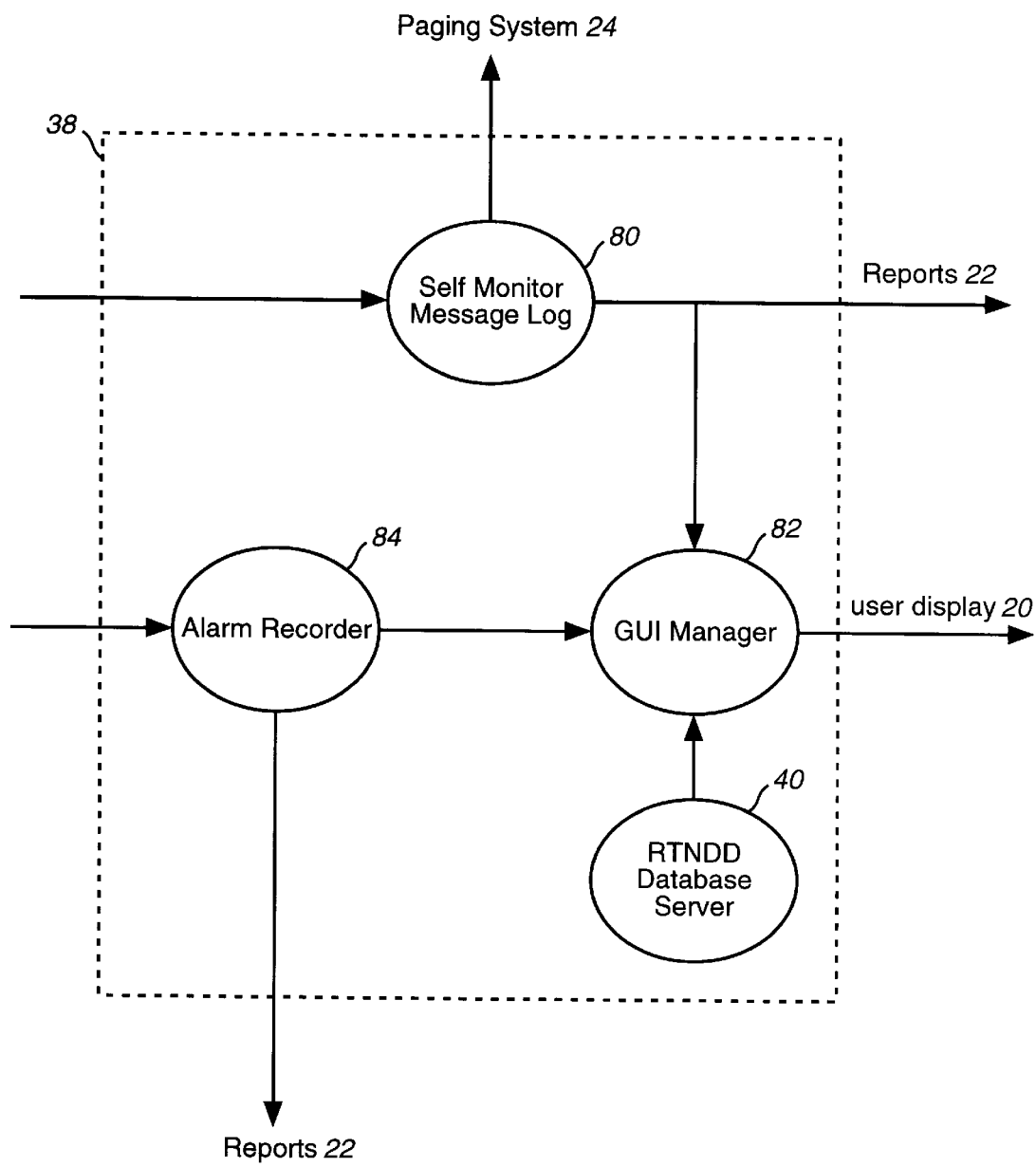
FIG. 17 is a block diagram of a reporting component of a network restoration system of the present invention.

FIG. 17 illustrates the logical architecture of the reporting 38 component. Reporting 38 consists of a self monitor message log 80, which receives error and status messages from each of the other RTR 10 components. These messages are stored in a log file. They can be made available for hard copy and soft copy reports 22. They can also be provided to a GUI manager 82 for output to a user display 20. These messages can also be match to certain thresholds and message type detectors. If a message of a certain type, or messages that exceed a certain threshold, are detected, a notification to a paging system 24 can be made so as to page the appropriate support personnel.

Reporting 38 also consists of an alarm recorder 84. All alarms received by RTR 10 via network control 36 are recorded in an internal list by the alarm recorder 84. This list can be provided to various reports 22, and to a user display 20 via a GUI manager 82. The GUI manager 82 formats and drives output to a user display 20. The GUI manager 82 can be used to output formatted data from the RTNDD 40. A database server process is incorporated into reporting 38 to provide the GUI manager 82 with RTNDD 40 data.

Therefore, the system and method disclosed herein have inherent advantages over the prior art. While certain embodiments of the invention have been illustrated for the purposes of this disclosure, numerous changes in the arrangement and construction of the parts may be made by those skilled in the art, such changes being embodied within the scope and spirit of the present invention as defined by the appended claims.

What is claimed is:

1. A system for isolating an outage within a communications network comprising:

a database containing the configuration of switching elements within said network;

a plurality of instructions resident on a memory device for operating a control computer, said plurality of instruction including a code segment for receiving alarms form said switching elements, a code segment for determining which of said alarms indicate said outage, and a code segment for identifying the location of said switching elements that isolate said outage based upon the configuration of said switching elements in said database; and means for initiating said plurality of instructions and operative to remove said outage from within said communications network and restore communications within said communications network.

2. The system as recited in claim 1 wherein said code segment for receiving alarms from said switching elements identifies which ports on which of said switching elements are in alarm.

3. The system as recited in claim 2 wherein said code segment for identifying the location of said switching elements includes identifying the location of said ports in alarm on one of said switching elements relative to the location of said ports in alarm on another of said switching element.

4. The system as recited in claim 1 wherein said code segment for determining which of said alarms indicate said outage further includes determining if said alarms were generated on a spare trunk.

5. The system as recited in claim 1 wherein said code segment for determining which of said alarms indicate said outage further includes determining if said alarms were generated on a traffic trunk.

6. The system as recited in claim 5 wherein said code segment for determining which of said alarms indicate said outage further includes determining the priority of said traffic trunk.

7. The system as recited in claim 1 wherein said code segment for determining which of said alarms indicate said outage further includes requiring said alarms to be generated from more than one port on said switching element.

8. The system as recited in claim 1 wherein said code segment for identifying the location of said switching elements includes generating and maintaining a list of trunks based upon said alarms.

9. A method for isolating an outage within a communications network comprising:

storing the configuration of switching elements within said network in a database;

receiving alarms from said switching elements;

determining which of said alarms indicate said outage;

identifying the location of said switching elements that isolate said outage based upon the configuration of said switching elements in said database; and initializing said switching elements to isolate and remove said outage from within said communications network and restore communications within said communications network.

10. The method as recited in claim 9 wherein said step of receiving alarms from said switching elements further includes identifying which ports on which of said switching elements are in alarm.

11. The method as recited in claim 10 wherein the step of identifying the location of said switching elements further includes identifying the location of said ports in alarm on one of said switching elements relative to the location of said ports in alarm on another of said switching element.

12. The method as recited in claim 9 wherein the step of determining which of said alarms indicate said outage further includes determining if said alarms were generated on a spare trunk.

13. The method as recited in claim 9 wherein the step of determining which of said alarms indicate said outage further includes determining if said alarms were generated on a traffic trunk.

14. The method as recited in claim 13 wherein said step of determining which of said alarms indicate said outage further includes determining the priority of said traffic trunk.

15. The method as recited in claim 9 wherein the step of determining which of said alarms indicate said outage further includes requiring said alarms to be generated from more than one port on said switching element.

16. The method as recited in claim 9 wherein the step of identifying the location of said switching elements includes generating and maintaining a list of trunks based upon said alarms.

17. A system for isolating an outage within a communications network comprising:

a database containing the configuration of switching elements within said network; and a plurality of instructions resident on a memory device for operating a control computer, said plurality of instructions including a code segment for receiving alarms from said switching elements, a code segment for identifying which ports on which of said switching elements are in alarm, a code segment for determining which of said alarms indicate said outage, and a code segment for identifying the location of said switching elements that isolate said outage based upon the configuration of said switching elements in said database, said plurality of instructions operative to initiate isolation of said outage from the communications network and restore communications within said communications network.

18. The system as recited in claim 17 wherein said code segment for identifying the location of said switching elements includes identifying the location of said ports in alarm on one of said switching elements relative to the location of said ports in alarm on another of said switching element.

19. The system as recited in claim 17 wherein said code segment for determining which of said alarms indicate said outage further includes requiring said alarms to be generated from more than one port on said switching element.

20. The system as recited in claim 17 wherein said code segment for identifying the location of said switching elements includes generating and maintaining a list of trunks based upon said alarms.

* * * * *